US008341861B2

(12) United States Patent
Matsushita

(10) Patent No.: US 8,341,861 B2
(45) Date of Patent: Jan. 1, 2013

(54) DISPLAY STRUCTURE AND SUPPORT BODY

(76) Inventor: Teruaki Matsushita, Nara (JP)

(*) Notice: Subject to any disclaimer, the term of this patent is extended or adjusted under 35 U.S.C. 154(b) by 225 days.

(21) Appl. No.: 12/993,364

(22) PCT Filed: Aug. 3, 2009

(86) PCT No.: PCT/JP2009/003692
§ 371 (c)(1),
(2), (4) Date: Nov. 18, 2010

(87) PCT Pub. No.: WO2010/055598
PCT Pub. Date: May 20, 2010

(65) Prior Publication Data
US 2011/0056105 A1 Mar. 10, 2011

(30) Foreign Application Priority Data

Nov. 13, 2008 (JP) ................................. 2008-290848
Jun. 15, 2009 (WO) .................. PCT/JP2009/060863

(51) Int. Cl.
G09F 7/00 (2006.01)
G09F 11/02 (2006.01)
G09F 3/18 (2006.01)
G09F 3/00 (2006.01)
G09D 3/06 (2006.01)
E05B 37/00 (2006.01)

(52) U.S. Cl. .................... 40/611.06; 40/650; 40/661.05; 40/336; 40/111; 40/112; 40/113; 40/334; 40/306; 40/316; 40/611.08; 40/611.07; 40/600; 40/493; 40/707; 40/710; 70/21; 70/22

(58) Field of Classification Search ............... 40/611.06, 40/650, 661.05, 336, 111, 112, 113, 334, 40/306, 316, 611.08, 611.07, 600, 493, 707, 40/710; 70/21, 22
See application file for complete search history.

(56) References Cited

U.S. PATENT DOCUMENTS 4,669,208 A 6/1987 Stoddard
(Continued)

FOREIGN PATENT DOCUMENTS

JP 36-005843 3/1961
(Continued)

OTHER PUBLICATIONS

International Search Report prepared by Japanese Patent Office on Aug. 25, 2009, for International Application No. PCT/JP2009/003692.

Primary Examiner — Tashiana Adams
Assistant Examiner — Syed A Islam
(74) Attorney, Agent, or Firm — Sheridan Ross P.C.

(57) ABSTRACT

Disclosed is a display structure in which an insertion opening, slide grooves, a first fitting portion and a ridged portion along which the display plate bends when the display plate is bent arranged in the loading sections of a support body in a suitable manner to ensure that when the display plate is inserted into or removed from the loading unit, a force is exerted on both sides of the display plate in either the direction from the display surface side to the rear surface side thereof or the direction from the rear surface side to the display surface side thereof, and a force is exerted in another direction at the center region of the display plate. As a result of configuring in this manner, the display plate deforms so that the entire display surface side comes to have a convex or concave shape, thereby allowing the display plate to be attached to or detached from the support body without forcible localized deformation of the display plate.

15 Claims, 18 Drawing Sheets

U.S. PATENT DOCUMENTS 4,942,684 A * 7/1990 Oehmichen .................. 40/710
5,448,844 A * 9/1995 Miller et al. ............. 40/611.06

FOREIGN PATENT DOCUMENTS

| | | |
|---|---|---|
| JP | 52-007536 | 3/1977 |
| JP | 55-141159 | 10/1980 |
| JP | 56-018696 | 5/1981 |
| JP | 62-73288 | 3/1987 |
| JP | 64-071976 | 3/1989 |
| JP | 3-000099 | 1/1991 |
| JP | 4-151010 | 5/1992 |
| JP | 4-137640 | 12/1992 |
| JP | 7-29236 | 6/1995 |

* cited by examiner

Fig.3(a)
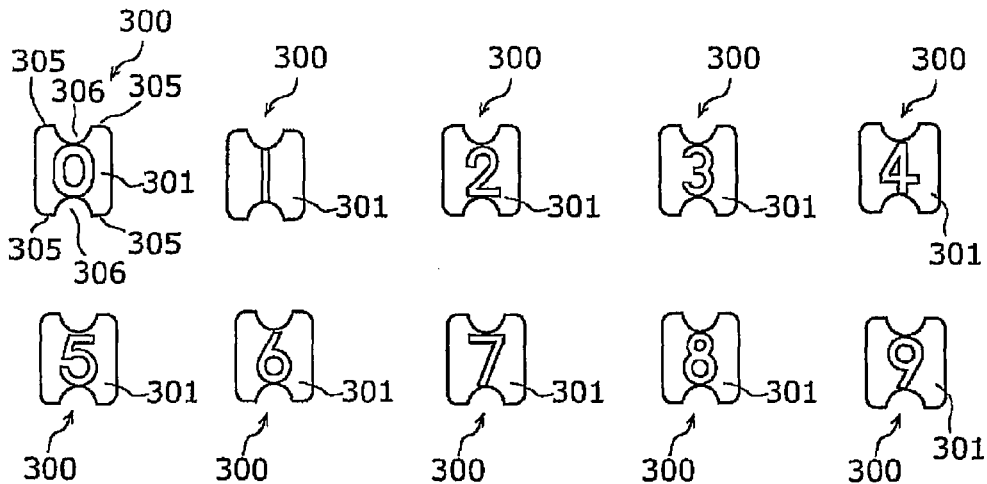
Fig.3(b)
Fig.3(c)
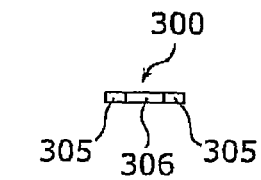
Fig.3(d)
Fig.3(e)
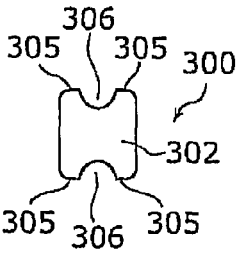
Fig.3(f)
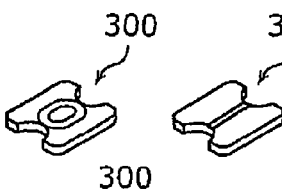
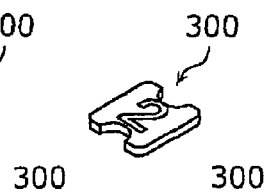
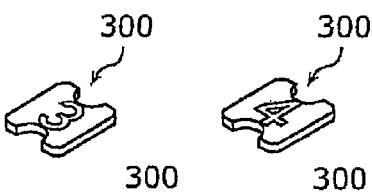
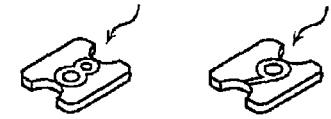

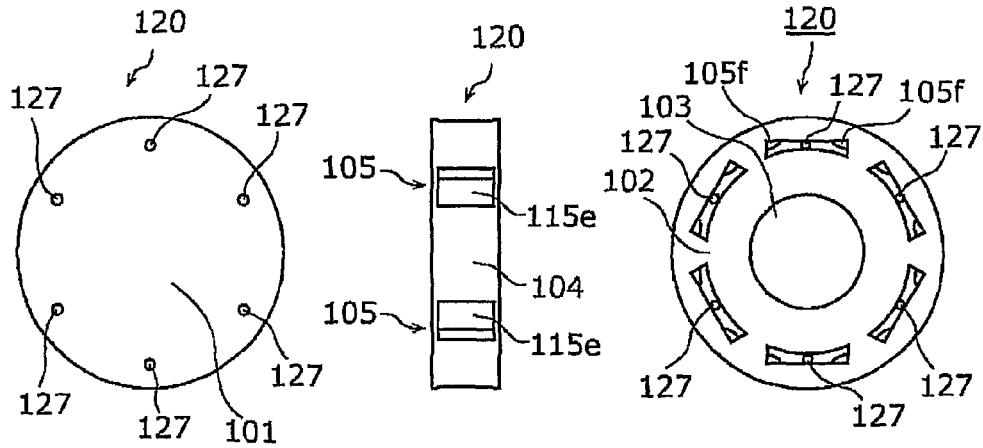
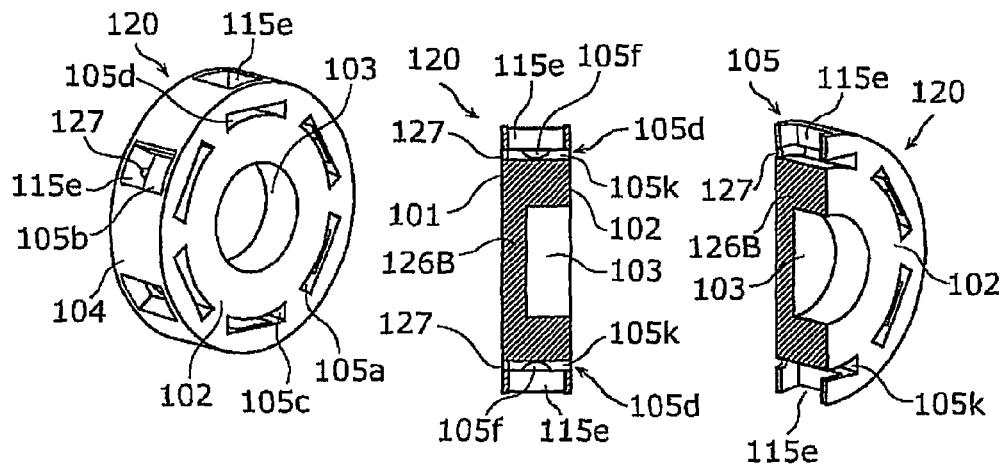
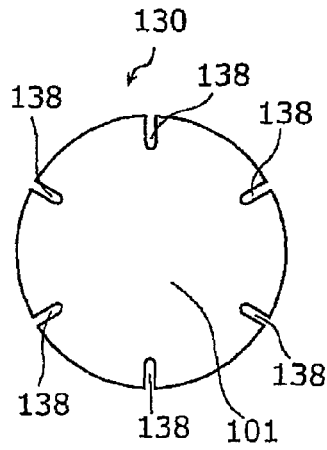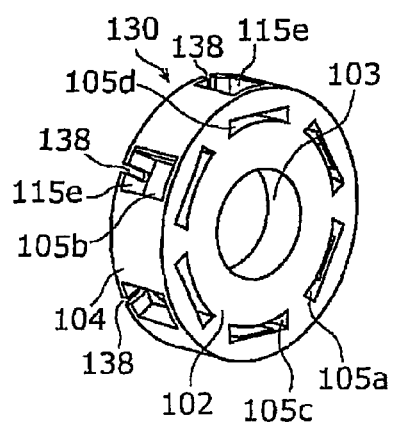

Fig.8(a)
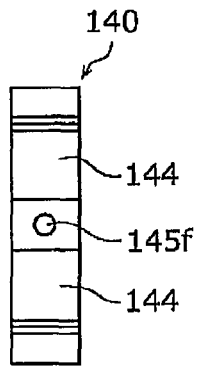
Fig.8(b)    Fig.8(c)    Fig.8(d)
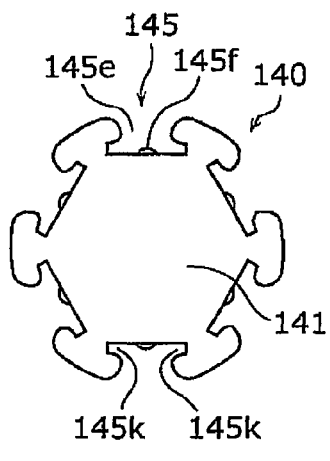 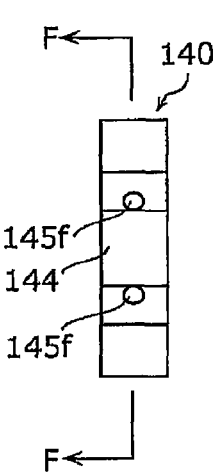 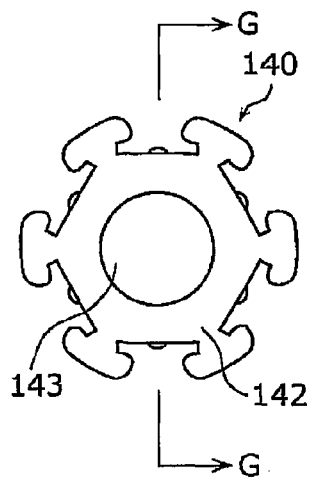
Fig.8(e)    Fig.8(f)
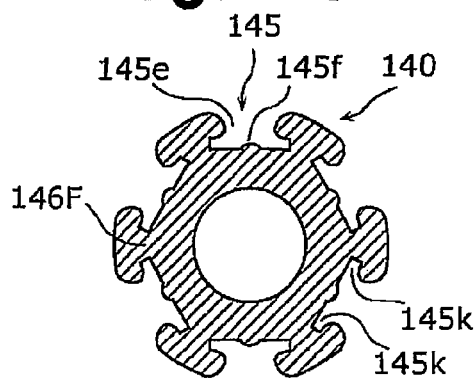 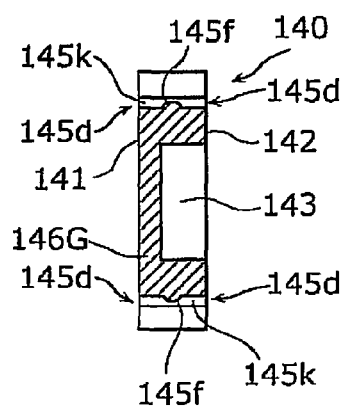

Fig.10(a1)
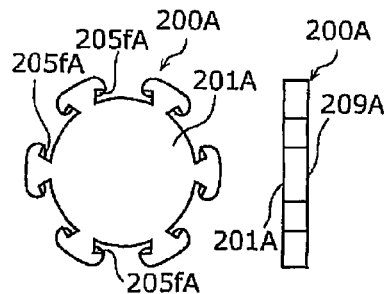
Fig.10(a2)  Fig.10(a3)
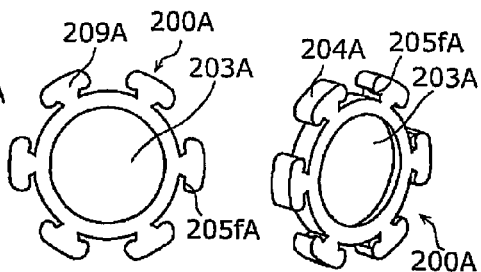
Fig.10(a4)
Fig.10(b1)
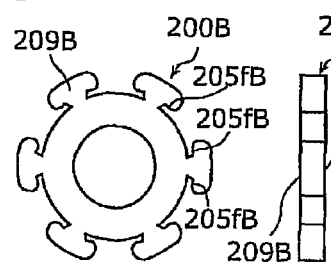
Fig.10(b2)  Fig.10(b3)
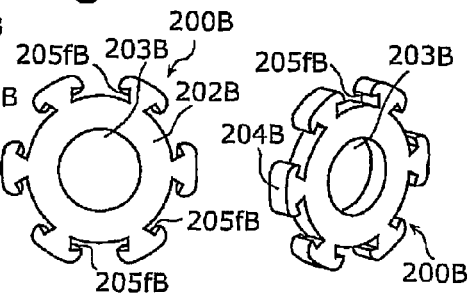
Fig.10(b4)
Fig.10(c1)
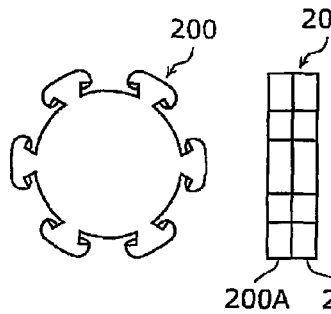
Fig.10(c2)  Fig.10(c3)
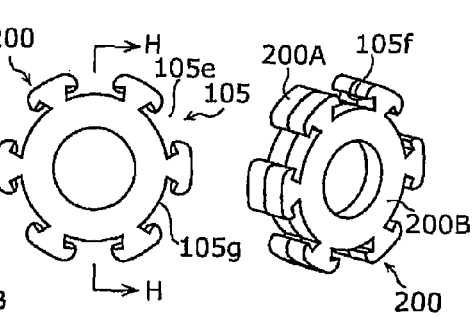
Fig.10(c4)
Fig.10(d1)
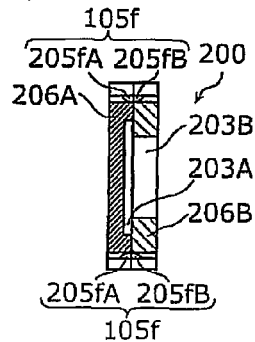
Fig.10(d2)
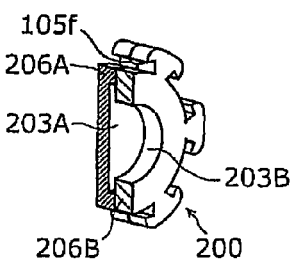

Fig.11 (a1) 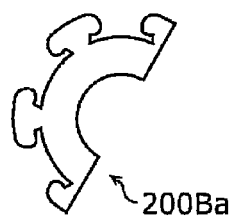 Fig.11 (a3) 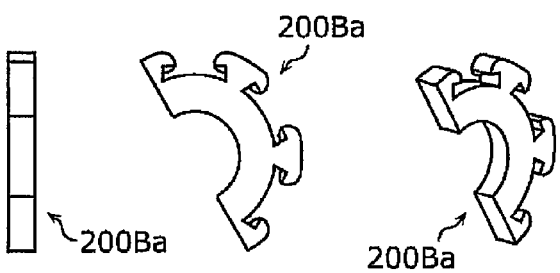
Fig.11 (a2) Fig.11 (a4)
Fig.11 (b1) 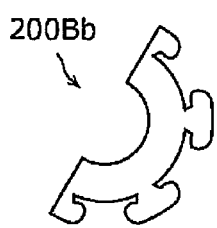 Fig.11 (b3) 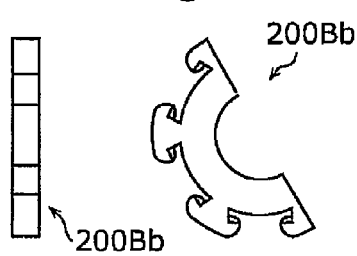 
Fig.11 (b2) Fig.11 (b4)
Fig.11 (c1) 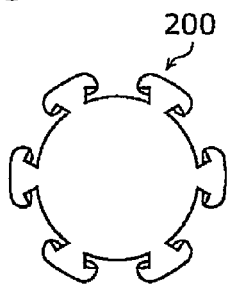 Fig.11 (c3) 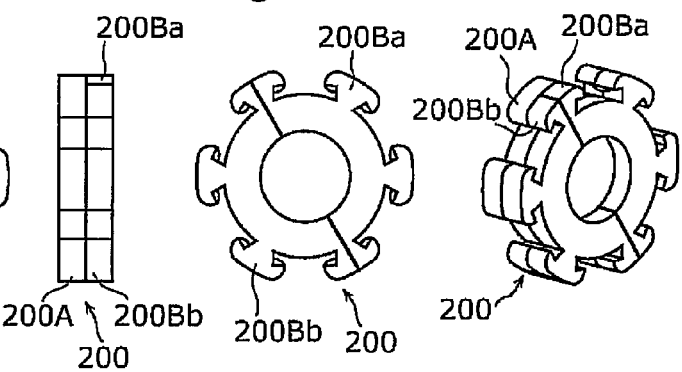
Fig.11 (c2) Fig.11 (c4)

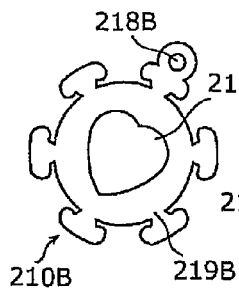
Fig.12(a1)
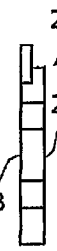
Fig.12(a2)
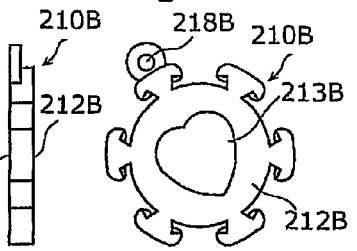
Fig.12(a3)
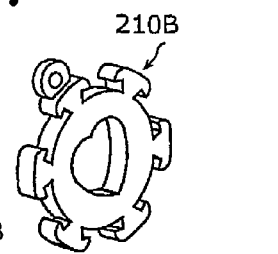
Fig.12(a4)
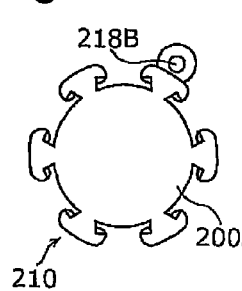
Fig.12(b1)
Fig.12(b2)
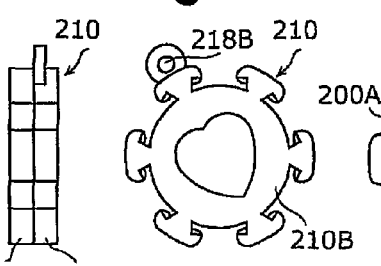
Fig.12(b3)
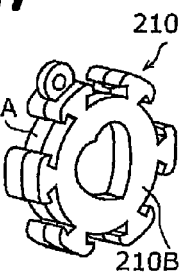
Fig.12(b4)
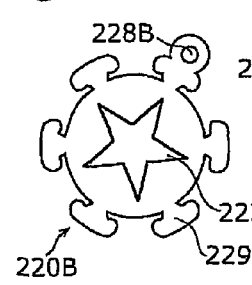
Fig.12(c1)
Fig.12(c2)
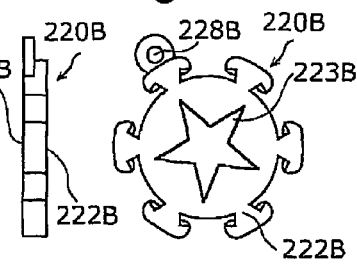
Fig.12(c3)
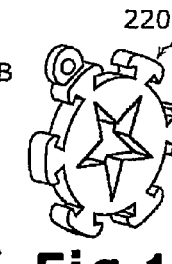
Fig.12(c4)
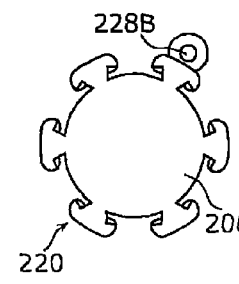
Fig.12(d1)
Fig.12(d2)
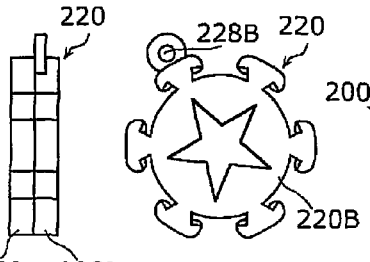
Fig.12(d3)
Fig.12(d4)

Fig.13(a)
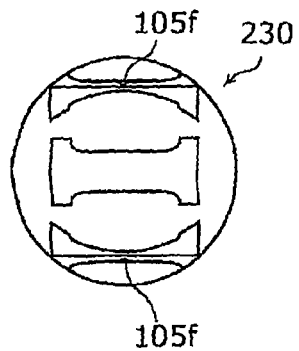
Fig.13(b)   Fig.13(c)   Fig.13(d)
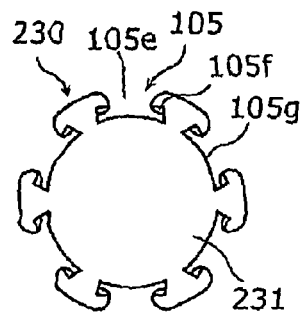 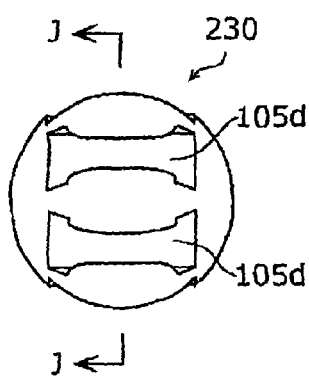 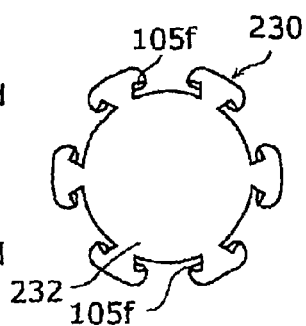
Fig.13(e)   Fig.13(f)
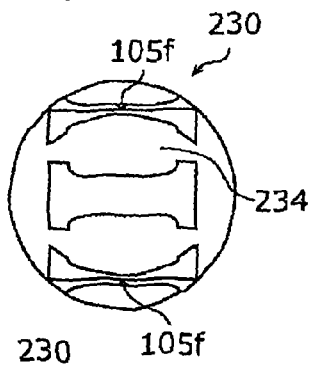 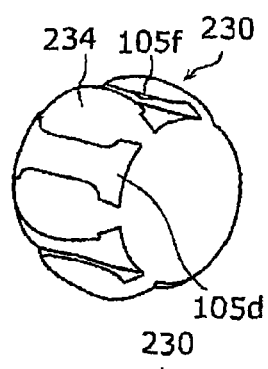
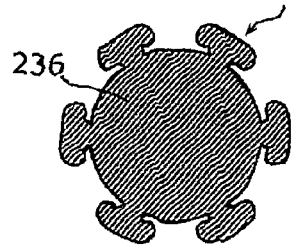 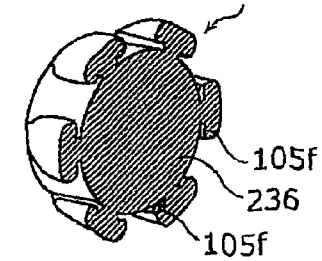
Fig.13(g)   Fig.13(h)

Fig.14(a)
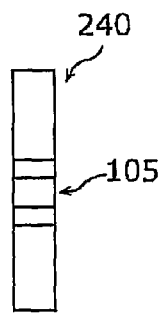
Fig.14(b) Fig.14(c) Fig.14(d)
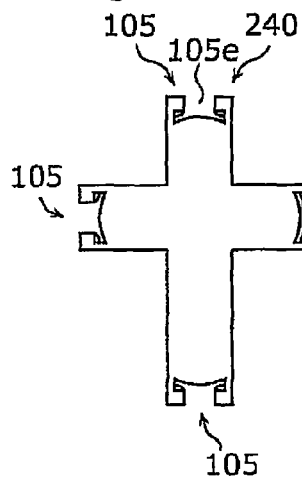 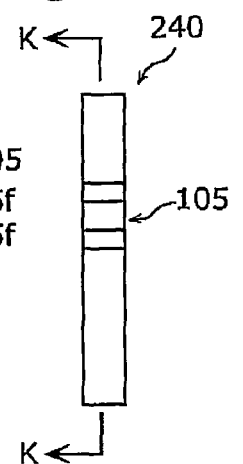 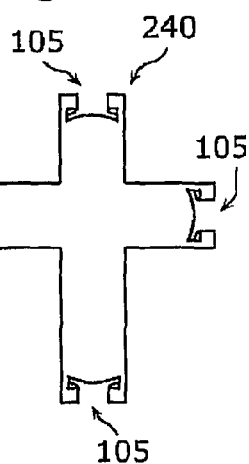
Fig.14(e) Fig.14(f)
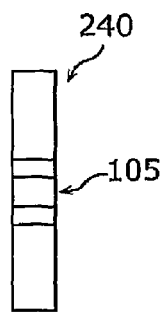 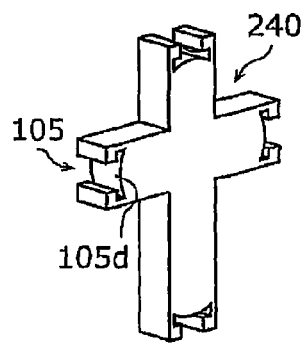
Fig.14(g) Fig.14(h)
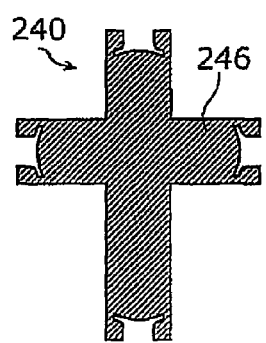 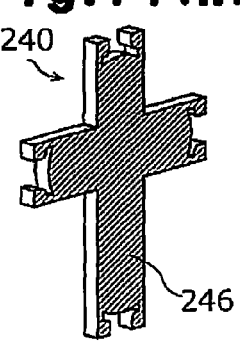

Fig.17(a) Fig.17(b) Fig.17(c)
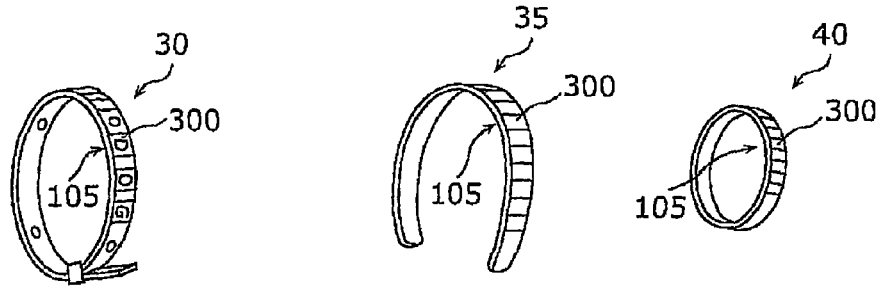
Fig.17(d) Fig.17(e)
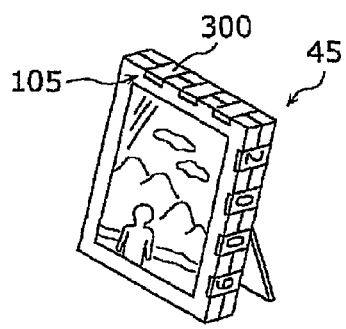 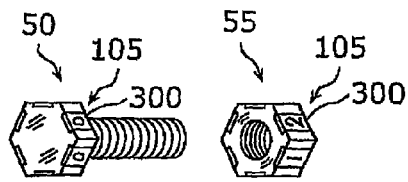
Fig.17(f) Fig.17(g) Fig.17(h)
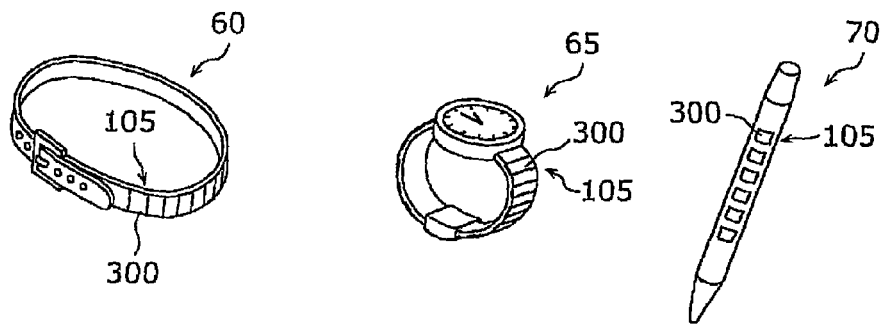
Fig.17(i) Fig.17(j)
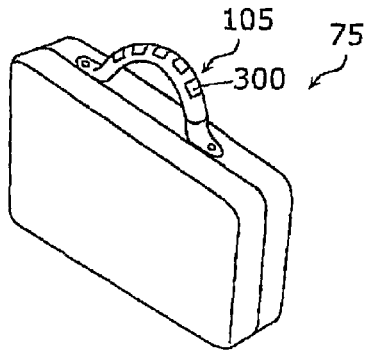 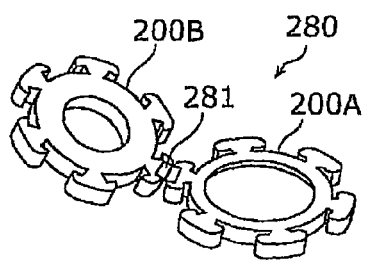

DISPLAY STRUCTURE AND SUPPORT BODY

CROSS REFERENCE TO RELATED APPLICATIONS

This application is a national stage application under 35 U.S.C. 371 of PCT Application No. PCT/JP2009/003692 having an international filing date of 3 Aug. 2009, which designated the United States, which PCT application claimed the benefit of Japanese Patent Application No. 2008-290848 filed 13 Nov. 2008, and International Application No. PCT/JP2009/060863 filed Jun. 15, 2009, the entire disclosure of each of which is hereby incorporated by reference.

FIELD OF THE INVENTION

The present invention relates to a display structure having a display board and a support body for supporting the display board.

BACKGROUND OF THE INVENTION

Conventionally, a display structure having a display board and a support body for supporting the display board are known. For example, Patent Document 1 discloses a technique related to attachment/detachment of a display board with respect to a support body.

FIGS. 18(a) and 18(b) each schematically shows the configuration of a telephone set 902 as an example of a conventional display structure.

In the telephone set 902 illustrated in FIGS. 18(a) and 18(b), a sheet 908 displaying characters and the like is a display board. A body 909, which supports the sheet 908, is a support body.

As shown in FIG. 18(b), the sheet 908, which has deformation and shape restoration properties, is inserted through a sheet insertion port 907. When the sheet 908 contacts a stopper projection 909a, the sheet 908 is deformed. Then, with the deformed portion moved from the leading side to the trailing side, the sheet 908 is sent into the gap between a transparent member 910 and a plurality of projections 911b projecting from a sheet guide 911.

The sheet 908 includes a holding portion 908b formed at the trailing end of the sheet 908 and a small hole 908c, that is, a hole engaged with the stopper projection 909a, which is formed on the leading side of the holding portion 908b.

When the sheet 908 is inserted into the body 909 and the small hole 908c reaches the position corresponding to the stopper projection 909a, the shape restoring property of the sheet 908 causes the stopper projection 909a to be inserted into the small hole 908c. In this manner, the sheet 908 is mounted in the body 909.

The holding portion 908b may be held by a user's fingers and depressed by the user of the telephone set 902. This disengages the stopper projection 909a from the small hole 908c. The holding portion 908b is then pulled outward so that the sheet 908 is removed from the body 909.

PRIOR ART DOCUMENT

Patent Document

Patent Document 1: Japanese Laid-Open Utility Model Publication No. 4-137640

SUMMARY OF THE INVENTION

As has been described, in the conventional display structure including the display board and the support body for supporting the display board, the display board having the deformation/shape restoration properties has the holding portion, which is arranged at the trailing edge of the display board, and the stopper engagement hole, which is located on the leading side of the holding portion.

The support body includes a mounting portion in which the display board is mounted. The mounting portion has an insertion port through which the display board is inserted, an insertion space, which is a space in which the display board is arranged after having been inserted, and an engagement projection for retaining the display board.

The insertion space has relatively large room in the vicinity of the insertion port in order to allow the display board to move in the thickness direction of the display board when the display board is inserted. For the rest of the insertion space other than the vicinity of the insertion port, the insertion space has only relatively narrow room for allowing the display board to move in the thickness direction of the display board when the display board is inserted.

The engagement projection is arranged in the vicinity of the center of the insertion space near the insertion port. As viewed through the insertion port, the engagement projection projects in such a manner as to shield the narrow portion of the insertion space, which is the portion other than the vicinity of the insertion port.

As a result, when the display board is inserted into the mounting portion, a part of intense deformation moves in a wave-like manner from the leading side to the trailing side of the display board as the display board moves forward.

As a result, conventionally, the material and the shape of the display board must have improved deformation and shape restoration properties, which allow locally intense deformation of the display board and restoration of the original shape of the display board.

In other words, in the conventional display structure, the display board has to have sufficient deformation and sufficient shape restoration properties. Specifically, if the display board has insufficient deformation property, insertion of the display board in the insertion space becomes incomplete.

The deformation property of the display board is insufficient if, for example, the display board is formed of hard vinyl chloride or polypropylene and has small dimensions along its three axes, which are a thickness of approximately 0.5 mm, a width of approximately 7 mm, and a length of approximately 6 mm. In this case, the display board as a whole may be deformed in a moderately convex or concave shape. However, it is difficult to cause local intense deformation in the display board. This makes it difficult to mount the display board in the support body having the above-described conventional configuration.

If such a display board is forcibly inserted into the conventional support body, the engagement projection may damage the display board or the display board may damage the engagement projection.

If the display board is formed of metal such as copper and has small three dimensions, which are a thickness of approximately 0.2 mm, a width of approximately 7 mm, and a length of approximately 6 mm, it is difficult to cause local intense deformation in the display board. This also makes it difficult to mount the display board in the support body having the above-described conventional configuration.

Further, in the conventional display structure, the display board must include the holding portion for holding by a user's fingers. However, it is difficult to form such a holding portion for holding by a user's fingers in the above-described small-sized display board.

In this case, even if the display board is sufficiently soft and thus can be mounted in the support body, it is difficult to remove the display board after mounting.

Accordingly, it is an objective of the present invention to provide a display structure and a support body that allow for sufficient fitting between a display board and the support body even if the display board is inserted into the support body without causing local intense deformation, and allow detachment of the display board without causing local intense deformation of the display board.

It is another objective of the present invention to provide the above-described display structure including a display board that does not need a holding portion that is held by fingers and support body.

To solve the above-described problem, the display structure of the present invention is a display structure having a display board and a support body for supporting the display board, wherein the support body has a mounting portion in which the display board is mounted, wherein the mounting portion has a display window portion, an insertion port, an insertion space, and slide grooves, wherein the display window portion is a window through which the display board is displayed, the display window portion being a cutaway portion or a hole extending from an outer surface of the support body to the insertion space or formed of a transparent material in such a manner that the display board received in the insertion space is visible from a side corresponding to the outer surface of the support body, wherein the insertion port is an inlet port through which the display board is inserted into the insertion space, the insertion port having an opening in the outer surface of the support body at a position different from the position of the display window portion, wherein the insertion space is arranged at a position continuous from the insertion port, the insertion space being a space in which the display board is accommodated in a sliding manner, the insertion space being a space between a window side wall formed on a side corresponding to the display window portion and an opposing wall opposing the window side wall, wherein the slide grooves are side grooves arranged on both sides of the space between the window side wall and the opposing wall, the slide grooves being located on both sides of the insertion space, each of the slide grooves being a groove along which the display board is guided when inserted into the insertion space, wherein the window side wall or the opposing wall has a first fitting portion having a projection formed at a position over which at least a part of the display board passes when the display board is inserted into the insertion space, wherein the display board includes a display surface, a back surface, a leading portion, a trailing portion, two side portions, and a second fitting portion and has a deformation property and a shape restoration property, wherein the display surface and the back surface are arranged to be front and back, wherein the leading portion is a portion located forward when the display board is inserted into the insertion space in the sliding manner, wherein the trailing portion is a portion located on a trailing side when the display board is inserted into the insertion space in the sliding manner, wherein the two side portions are side portions arranged on both sides of the display board and in a space between the display surface and the back surface and a space between the leading portion and the trailing portion, each of the side portions being a portion located in the corresponding one of the slide grooves on both sides when the display board is inserted into the insertion space in the sliding manner, wherein the second fitting portion has a cutaway portion, a hole, or a recess that is fitted to the first fitting portion, wherein one of the window side wall and the opposing wall has a bulging portion rising in or in the vicinity of a middle position between the slide grooves formed on both sides, wherein the slide grooves on both sides, the first fitting portion, and the bulging portion are arranged in such a manner that, when the display board is inserted into the insertion space through the insertion port until the display board reaches an fitting position at which the second fitting portion and the first fitting portion become fitted to each other, a portion between the two side portions of the display board deforms in a convex or concave shape toward the display surface with respect to the side portions so as to avoid the projection of the first fitting portion due to the deformation property of the display board, wherein the second fitting portion and the first fitting portion become fitted to each other at the fitting position due to the shape restoration property of the display board, and wherein the display board has at least one of a number, a character, a code, an image, a color, and a pattern forming an indicator formed on at least the display surface.

In this configuration, by pressing the display board from the insertion port into the insertion space, forces acting in mutually opposite directions are applied to the display board between the vicinity of the side portions on both sides of the display board and the vicinity of a middle position between the side portions on both sides.

Specifically, by pressing the display board into the insertion space, one of forces acting in different directions, which are a force acting in a direction from the display surface to the back surface and a force acting in a direction from the back surface to the display surface, is applied to the vicinity of the side portions on both sides of the display board. The other one of the forces acting in the different directions is applied to the vicinity of a middle position of the display board.

This causes deformation of the display board as a whole in a convex or concave shape toward the display surface.

Accordingly, in the display structure of the present invention, even if the display board has insufficient deformation property and is difficult to deform intensely and locally, the display board as a whole is moderately bent from one of the side portions toward the other when inserted into the mounting portion, as long as the display board is capable of being moderately bent. This allows the display board to smoothly move beyond the projection of the first fitting portion.

As a result, using the shape restoration property of the display board, the second fitting portion of the display board and the first fitting portion of the support body are fitted to each other at the fitting position.

The insertion space may extend through the support body and the mounting portion may include insertion ports formed at both ends of the insertion space.

In this configuration, after the display board is pressed into and mounted in the mounting portion of the support body using fingers, for example, the display board can be separated from the support body by pressing the display board out from one of the insertion ports to the other using a nail or the like.

Alternatively, by pressing an additional display board into the mounting portion through one of the insertion ports, mounting of the display board and removal of the previously mounted display board from the other one of the insertion ports are accomplished simultaneously.

For example, if a display board is small in size and cannot have a finger holding portion as in the case of the above-described case, it is difficult to hold and pull out the display board by a user's fingers. However, in the display board of the present invention, the above-described configuration makes it easy for the mounted display board to be pressed out from one of the insertion ports to the other using a nail or an additional display board.

Removal of the display board will now be described. When a display board to be detached is located at the position (the fitting position) at which the second fitting portion of the display board and the first fitting portion of the support body are fitted to each other, the display board is pressed from one of the insertion ports, unlike when the display board is inserted to the fitting position of these fitting portions through an insertion port. This deforms the display board in a manner avoiding the projection of the first fitting portion using the deformation property of the display board, and the second fitting portion and the first fitting portion are disengaged from each other. In this manner, the display board is removed from the mounting portion.

In this case, each insertion port functions not only as an inlet port for insertion of the display board, but also as an outlet port for removal of the display board. Accordingly, the insertion port is an inlet/outlet port for insertion and removal of the display board, which is an opening for insertion and removal of the display board.

If the window side wall includes the bulging portion, the projection of the first fitting portion may be one of projections arranged at mutually opposing positions on or in the vicinities of the bottoms of the slide grooves on both sides of the insertion space on the side corresponding to the opposing wall. If the opposing wall includes the bulging portion, the projection of the first fitting portion may be one of projections arranged at mutually opposing positions on or in the vicinities of the bottoms of the slide grooves on both sides of the insertion space on the side corresponding to the window side wall.

In this configuration, the support body of the present invention may be shaped as illustrated in FIG. 1(*g*) or FIG. 2, for example, and the display board may be shaped as illustrated in FIG. 3.

Specifically, to insert the display board into the insertion space, the display board is moved from the corresponding insertion port in a sliding manner in a predetermined direction along the slide grooves. After the display board contacts the projections of the first fitting portions when inserted, the display board as a whole bends along the bulging portion while deforming in a concave shape toward the bulging portion due to an effect of the bulging portion in a manner avoiding the projections of the first fitting portions. In this state, the display board is moved to the fitting position at which the second fitting portions and the first fitting portions are fitted to each other.

If the display board is thin and the second fitting portion of the display board is formed by a recess instead of a through hole, the recess has an insufficient thickness and is easily disengaged. Additionally, to form recesses, cutting or injection molding or punching after formation of a plate-like member having a large number of recesses must be carried out, which raises the manufacturing cost disadvantageously.

If the second fitting portion is formed as a through hole, punching of an inexpensive flat plate may be employed. However, if the through hole is arranged in the vicinity of the center of the space between the side portions on both sides, the hole is visible in an undesirable manner, which is disadvantageous from the view point of aesthetic appearance.

However, in the case of the display board corresponding to the support body of the above-described configuration, which is, specifically, the display board 300 illustrated in FIG. 3 corresponding to the support body 100 illustrated in FIG. 1(*g*) and FIG. 2 or the display board 330 illustrated in FIGS. 15(*c*1) to 15(*c*3) corresponding to the support body 260 illustrated in FIGS. 15(*b*1) to 15(*b*3), a cutaway portion or a hole is formed in the vicinity of each of the two side portions, which does not influence display by the display board. In other words, the cutaway portion or the hole is formed by punching a relatively thin flat plate using a punching die, which enables inexpensive manufacture of the display board.

Alternatively, the projection of the first fitting portion may be arranged in or in the vicinity of a middle position between the insertion ports arranged at both ends of the insertion space, the support body being formed by a plurality of support body forming members, two of the support body forming members each having a matching surface, the matching surfaces of the support body forming members being matched together, one of the two support body forming members having one of the insertion ports formed at both ends of the insertion space and a part of the projection of the first fitting portion, the other one of the two support body forming members having the other one of the insertion ports formed at both ends of the insertion space and the remaining part of the projection of the first fitting portion, the mounting portion being formed by matching the two support body forming members with each other at the matching surfaces, the cutaway portion or the hole or the recess of the second fitting portion of the display board being one of cutaway portions or holes or recesses arranged in or in the vicinity of a middle position between the leading portion and the trailing portion and in or in the vicinities of the side portions on both sides, the two support body forming members being joined together through the display board when the display board is inserted into and mounted in the mounting portion formed by the support body forming members and the projection of the first fitting portion becomes fitted to the cutaway portion or the hole or the recess of the second fitting portion.

In this configuration, the support body forming members forming the support body of the present invention are shaped as illustrated in FIGS. 10 to 12, for example. Specifically, the mounting portion is formed by matching the matching surfaces of the two support body forming members together. Then, the display board illustrated in FIG. 3 is mounted in the mounting portion, thus joining the support body forming members to each other.

Specifically, when the display board is mounted in the mounting portion formed by matching the two support body forming members with each other, the projection of the first fitting portion becomes fitted to the cutaway portion, the hole, or the recess of the second fitting portion of the display board due to the shape restoration property of the display board.

As a result, the projection of the first fitting portion, which is formed by the respective corresponding portions of the two support body forming members, is clamped by the display board from both sides. This holds the support body forming members in a state joined together through the display board.

The two support body forming members that are joined together through the display board are separated from each other by removing the display board from the mounting portion while deforming the display board.

Regarding joint of the support body forming members, as long as the projection of the first fitting portion can be held in a state clamped by the display board from the both sides, the projection of the first fitting portion may be located at any suitable position other than the middle position between the insertion ports arranged on both ends of the slide grooves. This is because the projection of the first fitting portion can be held in the state clamped by the display board from the both sides unless the projection of the first fitting portion is adjacent to any insertion port.

Alternatively, the projection of the first fitting portion may be the same part as the bulging portion.

In this configuration, the support body of the present invention is shaped as illustrated in FIGS. 8 and 9(a) to 9(d), for example. The display board is shaped as illustrated in FIGS. 9(e) to 9(k).

The opposing wall or the window side wall, which faces the window side wall or the opposing wall including the bulging portion, is inclined in correspondence with the rise of the bulging portion in such a manner that the display board is deformed in a convex shape along the rise of the bulging portion when inserted into the mounting portion. This allows the portion of the display board between the side portions on both sides, as a whole, to bend along the bulging portion.

Alternatively, the projection of the first fitting portion may be arranged in or in the vicinity of the middle position between the insertion ports located at both ends of the insertion space, the support body being formed by a plurality of support body forming members, two of the support body forming members each having a matching surface, the matching surfaces of the support body forming members being matched with each other, one of the two support body forming members including one of the insertion ports arranged at both ends of the insertion space and a part of the projection of the first fitting portion, the other one of the two support body forming members including the other one of the insertion ports arranged at both ends of the insertion space and the remaining part of the projection of the first fitting portion, the mounting portion being formed by matching the two support body forming members with each other at the matching surfaces, the hole or the recess of the second fitting portion of the display board being located at a position in or in the vicinity of the middle position between the leading portion and the trailing portion and in or in the vicinity of the middle position between the side portions on both sides, the two support body forming members being joined together through the display board when the display board is inserted into and mounted in the mounting portion formed by the support body forming members and the projection of the first fitting portion becomes fitted to the hole or the recess of the second fitting portion.

In this configuration, even if, for example, the support body illustrated in FIGS. 8 and 9(a) to 9(d) is divided into the two support body forming members illustrated in FIG. 10, the support body forming members are joined together by forming the mounting portion by matching the matching surfaces of the support body forming members with each other and then mounting the display board illustrated in FIGS. 9(e) to 9(k) in the mounting portion.

This is because the projection of the first fitting portion formed by the respective corresponding portions of the two support body forming members is fitted in the hole or the recess of the display board, which is the second fitting portion.

Further, by removing the display board from the mounting portion, the two support body forming members are separated from each other.

Alternatively, at least one of the matching surfaces of the two support body forming members may include a recessed portion.

In this configuration, the support body forming member of the present invention is shaped as illustrated in FIGS. 10(a1) to 10(a4), for example. Using the recessed portion as an accommodation space, an object such as a card or a coin is received in the recessed portion. Then, the mounting portion is formed by matching the matching surface of the support body forming member with a matching surface of an additional support body forming member and the display board is mounted in the mounting portion. This joins the support body forming members together, with the object accommodated in the recessed portion.

In this manner, the display structure of the present invention can be embodied as a pendant or a broach having an accommodation space.

Assume that the additional support body forming member has a circular, heart-shaped, or star-shaped through hole extending from the matching surface to the outer surface of the support body forming member. In this case, an object such as a plate-like carved ornament or a photograph, which has such a size that the object does not separate from the through hole, is received in a recessed portion formed in the matching surface of the support body forming member. The support body forming members are then joined together through the display board. As a result, the object received in the recessed portion is visible through the through hole.

In this manner, the support body forming member and the support body shaped as illustrated in FIG. 12, for example, may be formed. As a result, other than a pendant or a broach, the display structure of the present invention is embodied as a name tag by accommodating a plate with a name on it in the recessed portion.

In other words, the display structure of the present invention is employed as a name tag by mounting the display boards with each displaying a character in the corresponding mounting portions of the support body. Further, by accommodating the plate with the name on it in the recessed portion, the display structure is used as a fashionable name tag.

Alternatively, the support body forming member having the recessed portion may further include a through hole, and the through hole may be arranged at a position through which the recessed portion and the outer surface are connected to each other.

In this configuration, the object received in the recessed portion is visible. For example, a circular, heart-shaped, or star-shaped through hole may be formed in the recessed portion of the support body forming member illustrated in FIGS. 10(a1) to 10(a4). Then, an object such as a photograph having such a size that the object cannot be removed through the through hole is accommodated in the recessed portion. Subsequently, by matching the matching surface of the support body forming member with a matching surface of an additional support body forming member, the mounting portion is formed. The display board is then installed in the mounting portion to join the support body forming members to each other.

As a result, even if the additional support body forming member does not have a through hole or a transparent portion, the object received in the recessed portion is visible through the through hole of the support body forming member having the recessed portion.

The object received in the recessed portion is visible also when a transparent member is employed instead of the through hole. Alternatively, the object in the recessed portion is visible when a transparent member is fitted in the through hole.

Alternatively, the display structure of the present invention may include a hinge for joining the two support body forming members to each other.

In this configuration, when the display board is removed from the mounting portion formed by the two support body forming members, the support body forming members may be separated from each other by separating the matching surfaces from each other with respect to the hinge. Further, in this state, the support body forming members may be joined together by matching the matching surfaces with respect to the hinge.

Alternatively, the matching surface of each of the two support body forming members may include a through hole extending to the outer surface of the support body forming member.

In this configuration, the display structure may be employed as a ring or a bracelet if the size of the display structure is adjusted.

For example, using two support body forming members illustrated in FIGS. 10(b1) to 10(b4), the mounting portion is formed by matching the matching surfaces of the support body forming members with each other. The display board is then mounted in the mounting portion. In this manner, a display structure having a through hole formed in a central portion of the display structure is assembled. The display structure is used as a ring or a bracelet.

Alternatively, the mounting portion of the display structure of the present invention may have the insertion port formed on a side corresponding to the trailing portion of the display board and a press-out hole or a press-out groove on a side corresponding to the leading portion of the display board when the display board is mounted in the mounting portion, the press-out hole being a hole used for pressing out the display board when removing the display board mounted in the mounting portion through the insertion port, the press-out groove being a groove used for pressing out the display board when removing the display board mounted in the mounting portion through the insertion port.

In this configuration, after the display board is mounted in the support body illustrated in FIG. 7, for example, and the display structure is completed, the display board may be removed from the support body using a bar-like object such as a pin.

Further, the support body having the insertion port at one end of the insertion space and the press-out hole or the press-out groove at the other end of the insertion space may have other characteristics like those described above. For example, like the support body illustrated in FIGS. 8 and 9(a) to 9(d), the projection of the first fitting projection may be with the same part as the bulging portion. Alternatively, like the support body illustrated in FIGS. 10 to 12, the support body may be formed by a plurality of support body forming members. Further, at least one of the support body forming members forming the support body may have a recessed portion or a through hole.

In other words, any suitable combination of these characteristics may be employed as needed.

As the support body of the present invention, the above described support body, which forms (is a component of) the above-described display structure of the present invention, may be employed.

As the support body forming member of the present invention, the above-described support body forming member, which forms (is a component of) the above-described support body of the present invention, may be employed.

As has been described, in the display structure formed by the display board and the support body of the present invention, the display board is mounted in the support body simply by pressing the display board into the support body, without directly deforming the display board, when the display board is inserted into the support body.

By forming the press-out hole or the press-out groove at the end opposite to the end corresponding to the insertion port of the insertion space, the display board is selectively inserted and removed through the insertion port.

If the insertion ports are arranged on both sides of the insertion space, the display board is inserted from either one of the insertion ports. Also, simply by pressing the display board from the insertion port on one side, the display board is detached through the insertion port at the opposite side.

In the display structure of the present invention, the display board is attachable/detachable with respect to the support body without causing local intense deformation in the display board. As a result, a material having insufficient shape restoration property can be employed for the display board of the display structure.

Also, according to the present invention, even if a display board is small in size and cannot have a finger holding portion, the display board is sufficiently fitted to the support body when mounted in the support body. This facilitates attachment/detachment of the display board with respect to the support body. Accordingly, the display structure having the attachable/detachable display board is reduced in size.

As a result, the display structure of the present invention may be used as a pendant, a broach, an accessory such as an earring, a dial member of a dial lock, a key ring, a name tag attached to a cloth, or the like.

BRIEF DESCRIPTION OF THE DRAWINGS

FIG. 3 includes diagrams showing a display board corresponding to the support body illustrated in FIG. 1, as viewed from various directions;

FIG. 7 includes diagrams showing a support body having a press-out hole as viewed from various directions, including cross-sectional views showing the support body, and a left side view and a perspective view showing a support body having a press-out groove;

FIG. 8 includes diagrams showing a support body having projections in opposing walls as viewed from various directions, including cross-sectional views showing the support body;

FIG. 10 includes diagrams showing an example of a support body formed by two support body forming members;

FIG. 11 includes diagrams showing an example of a support body formed by three support body forming members;

FIG. 12 includes diagrams showing other examples of support bodies each formed by two support body forming members;

FIG. 13 includes diagrams showing an example of a spherical support body;

FIG. 14 includes diagrams showing an example of a cross-shaped support body;

FIG. 17 includes diagrams showing various applications of the display structure according to the invention.

DETAILED DESCRIPTION OF THE PREFERRED EMBODIMENTS

One embodiment of the present invention will now be described with reference to the attached drawings.

Figure 1:
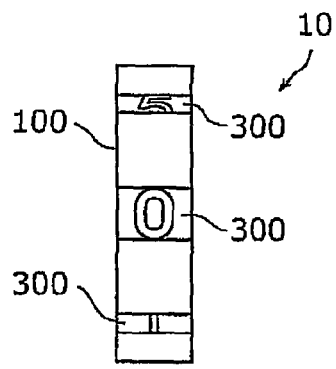
FIG. 1 includes diagrams showing a display structure according to one embodiment of the present invention as viewed from various directions, including perspective views showing a support body.
Figure 1:
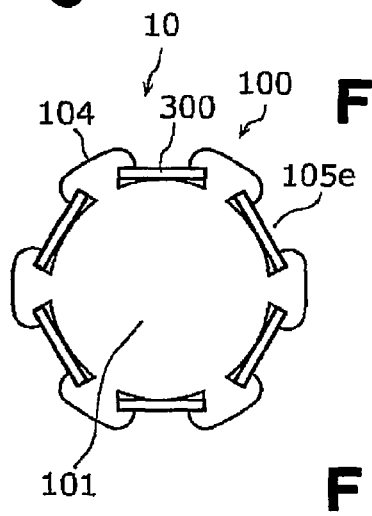
Figure 1:
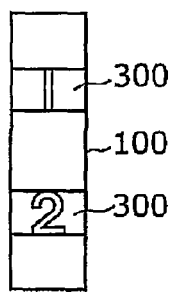
Figure 1:
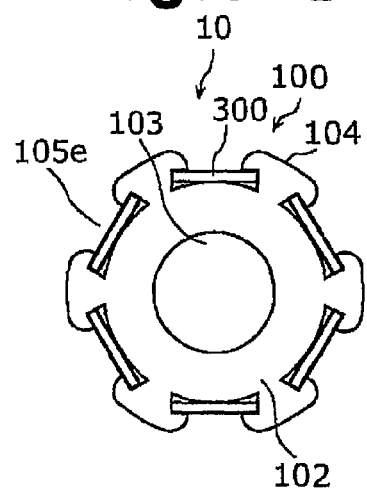
Figure 1:
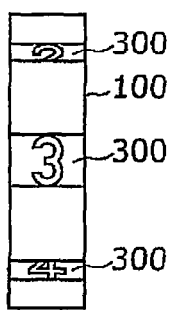
Figure 1:
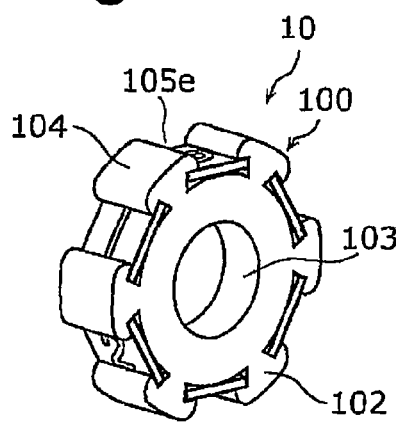
Figure 1:
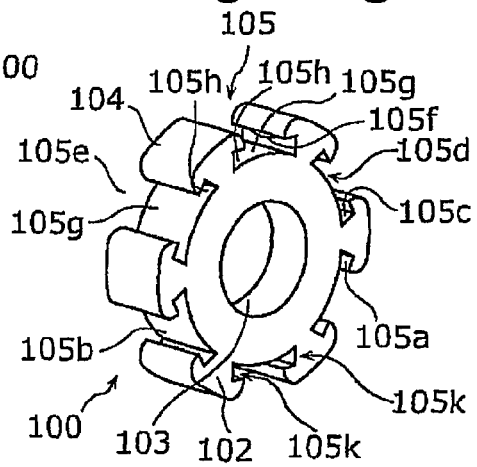

FIG. 1 includes diagrams showing a display structure 10 as viewed from various directions, including diagrams showing a support body 100, which is one of the components of the display structure 10, as viewed from above and the front right.

FIGS. 1(a) to 1(f) are a top view, a left side view, a front view, a right side view, a bottom view, and a perspective view from above and the front right, respectively, showing the display structure 10. FIG. 1(g) is a perspective view showing the support body 100 as viewed from above and the front right.

As shown in FIGS. 1(a) to 1(f), the display structure 10 has the support body 100, which is a main component of the display structure 10, and a plurality of display boards 300.

In the example shown in FIGS. 1(a) to 1(f), six display boards 300 each serving as a component of the display structure 10 are employed. Each of the display boards 300 has a display surface that displays a number. The display surfaces may display other objects than numbers, such as characters, codes, marks, images, colors, or patterns. The same applies to the display boards discussed below.

When the six display boards 300 are all removed from the display structure 10 in the state illustrated in FIG. 1(f), the support body 100 is in the state illustrated in FIG. 1(g).

Figure 2A:
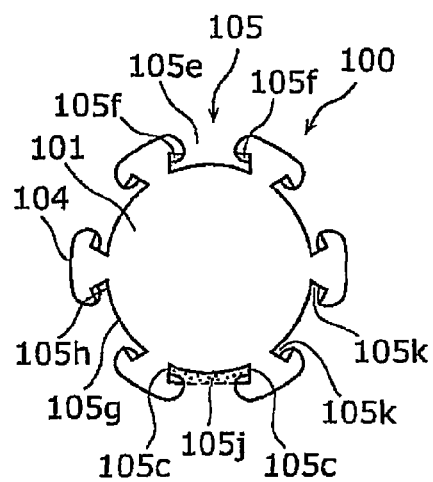
FIG. 2 includes a side view, a front view, and a cross-sectional view showing the support body illustrated in FIG. 1.
Figure 2B:
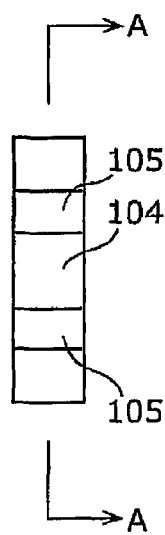
Figure 2C:
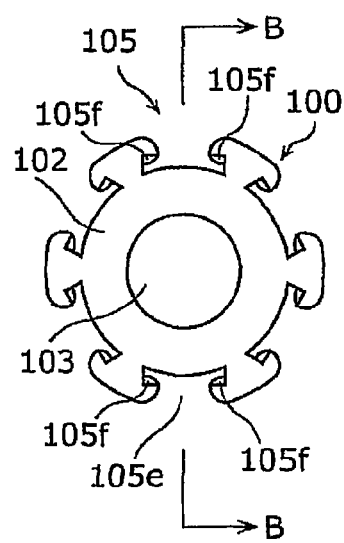
Figure 2D:
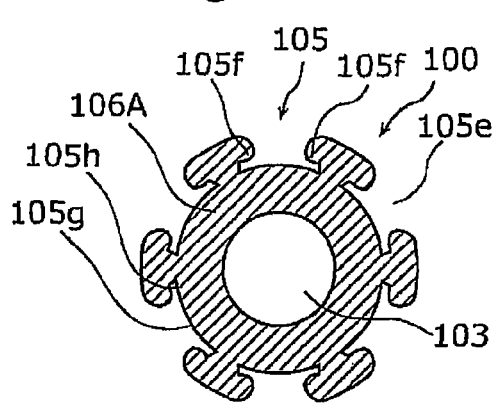
Figure 2E:
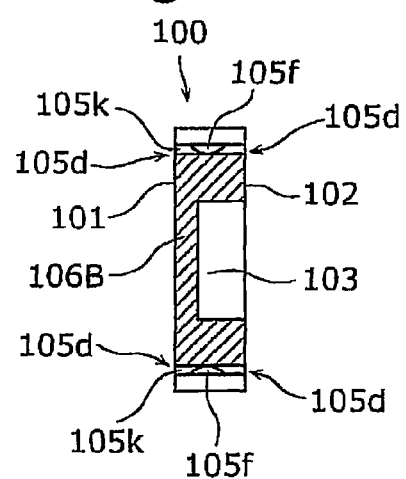

FIGS. 2(a) to 2(c) are a left side view, a front view, and a right side view, respectively, showing the support body 100. FIG. 2(d) is a diagram showing the A-A cross section of the support body 100 as viewed from the side corresponding to the left surface of the support body 100. FIG. 2(e) is a diagram showing the B-B cross section of the support body 100 as viewed from the side corresponding to the front surface of the support body 100.

The shaded area indicated by the reference numeral 106A corresponds to the A-A cross section and the shaded area indicated by the reference numeral 106B corresponds to the B-B cross section.

As illustrated in FIG. 1(g) and FIGS. 2(a) to 2(e), the support body 100 has a left outer surface 101, a right outer surface 102, a circular recessed portion 103, a main outer surface 104, and mounting portions 105.

Each of the mounting portions 105 includes window side walls 105a, an opposing wall 105b, groove bottom walls 105c, insertion ports 105d, a display window portion 105e, projections 105f, an insertion space 105j, and slide grooves 105k. The opposing wall 105b has a bulging portion 105g and recessed portions 105h.

Each opposing wall 105b faces the corresponding window side walls 105a. The space between the window side walls 105a and the opposing wall 105b is the insertion space 105j. Side grooves formed on both sides of the insertion space 105j are the slide grooves 105k.

The slide grooves 105k are grooves along which the display board 300 is guided when the display board 300 is inserted into the insertion space 105j. Each of the insertion ports 105d has such a size that the display board 300 can be inserted into the insertion space 105j.

With reference to FIGS. 1(g) and 2, the support body 100 as a whole has a thin columnar shape and is shaped to have the circular recessed portion 103, which is recessed in the axial direction of the support body 100, and the six mounting portions 105 aligned in a circumferential direction of the support body 100.

The left outer surface 101 and the right outer surface 102 of the support body 100 are parallel to each other. The main outer surface 104 extends perpendicularly to both of the left outer surface 101 and the right outer surface 102. The insertion space 105j extends perpendicularly to both of the left outer surface 101 and the right outer surface 102.

The main outer surface 104 refers specifically to an outer surface including the display window portions 105e, particularly, among the outer surfaces of the support body 100. However, if the outer surfaces of the support body are round surfaces, which are, for example, outer surfaces of a spherical body, there is no clear boundary between a main outer surface and other outer surfaces and the main outer surface and the other outer surfaces may not extend perpendicularly to one other. Alternatively, there may be cases in which a left outer surface and a right outer surface of a support body are not parallel to each other.

Each insertion space 105j is a space for accommodating the corresponding display board 300 and arranged at a position continuous from the associated insertion ports 105d. The insertion space 105j is the space between the window side walls 105a and the corresponding opposing wall 105b of the mounting portion 105.

In FIG. 2(a), the dotted area indicates one of the insertion spaces 105j. Although corresponding reference numerals are omitted from FIG. 2(a), each insertion space 105j has an insertion port 105d arranged closer to the sheet surface of FIG. 2(a) and an insertion port 105d arranged as spaced from the sheet surface of the drawing.

With reference to FIG. 2(a), each mounting portion 105 has the groove bottom walls 105c arranged on both sides of the insertion space 105j. Each of the groove bottom walls 105c is a wall by which the corresponding one of the window side walls 105a is connected to the opposing wall 105b. The groove bottom walls 105c are the bottoms of the slide grooves 105k.

However, the groove bottom walls 105c do not necessarily have to be employed. The window side walls 105a and the corresponding opposing wall 105b may be connected together at an acute angle or joined together directly through a curved surface. In other words, the bottom of each slide groove 105k does not necessarily have to be flat. The same applies to the other support bodies described below. Among the walls forming each insertion space 105j, the walls corresponding to the display window portion 105e are the window side walls 105a and the wall facing the window side walls 105a is the opposing wall 105b.

The insertion ports 105d are inlet ports through which the display board 300 is inserted into the insertion space 105j. With reference to FIGS. 1 and 2, the insertion ports 105d are arranged at both ends of each insertion space 105j. Each of the insertion ports 105d has an opening formed at a position different from the display window portion 105e and in the corresponding one of the left outer surface 101 and the right outer surface 102 of the support body 100.

This configuration allows insertion of the display board 300 into the insertion space 105j from both of the side corresponding to the left outer surface 101 of the support body 100 and the side corresponding to the right outer surface 102 of the support body 100. After the display board 300 is installed, the display board 300 is detachable from each of the sides corresponding to the left outer surface 101 and the side corresponding to the right outer surface 102.

The display window portion 105e is a window through which the display surface of the display board 300 mounted in the mounting portion 105 is viewed from outside the main outer surface 104. With reference to FIGS. 1(g), 2(a), 2(c), and 2(d), each of the display window portions 105e of the support body 100 is a cutaway portion extending from the insertion space 105j to the main outer surface 104, which is a cutaway portion extending from the window side walls 105a to the main outer surface 104.

The slide grooves 105k are side grooves arranged on both sides of each insertion space 105j. The slide grooves 105k are the grooves by which the display board 300 is guided when the display board 300 is inserted into the insertion space 105j. In other words, the space between the slide grooves 105k on both sides of each mounting portion 105 is the insertion space 105j. The display board 300 is mounted in the mounting portion 105 through the corresponding one of the insertion ports 105d in a sliding manner while being guided along the slide grooves 105k on both sides.

The projections 105f are arranged at mutually opposing positions on the bottoms of the slide grooves 105k on both sides of each insertion space 105j and on the side corresponding to the window side walls 105a.

Specifically, one of the projections 105f is located on the bottom of the corresponding one of the slide grooves 105k arranged on both sides of each insertion space 105j and on the side corresponding to the corresponding one of the window side walls 105a. The other one of the projections 105f is arranged on the bottom of the other one of the slide grooves 105k and on the side corresponding to the other one of the window side walls 105a. These projections 105f oppose each other.

Each of the projections 105f is a projection of a first fitting portion that becomes fitted to the display board 300 when the display board 300 is mounted in the insertion space 105j. Such fitting is enabled by arranging each projection 105f at a position over which at least a part of the display board 300 passes when the display board 300 is inserted into the insertion space 105j.

FIG. 2(d) is a diagram showing the A-A cross section 106A of the support body 100. The A-A cross section 106A is the cross section taken at the position corresponding to a half of the thickness of the support body 100. The thickness of the support body 100 herein refers to the distance between the left outer surface 101 and the right outer surface 102.

As illustrated in FIG. 2(d), the A-A cross section 106A, which is indicated by the shaded area, includes a cross section of each projection 105f. Specifically, the projection 105f is located in a middle position between the insertion ports 105d, which correspond to both ends of each slide groove 105k, and at the position corresponding to the half of the thickness of the support body 100.

With reference to FIG. 2, each mounting portion 105 of the support body 100 has a bilaterally symmetrical shape, which is mirror-image in shape with respect to the A-A cross section 106A.

In other words, the recessed portions 105h of each opposing wall 105b are portions that are recessed with respect to the bulging portion 105g.

FIGS. 3(a) to 3(f) are diagrams showing the display board 300, which is a component of the display structure 10. FIGS. 3(a) to 3(f) are a top view, a left side view, a front view, a right side view, a bottom view, and a perspective view from above and the front right, respectively.

FIG. 3(a) includes top views showing a plurality of display boards 300, which display different objects. Specifically, the display boards 300 have display surfaces 301 displaying different objects such as "0", "1", "2", "3", "4", "5", "6", "7", "8", or "9".

Each of the display boards 300 illustrated in FIG. 3(a) has the display surface 301, side portions 305, and cutaway portions 306.

FIG. 3(e) is a bottom view showing each display board 300. A back surface 302 is the backside of each display surface 301.

The display boards 300 illustrated in FIGS. 3(a) to 3(f) are formed of a material having deformation and shape restoration properties such as metal or plastic. The other display boards that will be described later are also assumed to be formed of metal or plastic and have the deformation and shape restoration properties.

Figure 4:
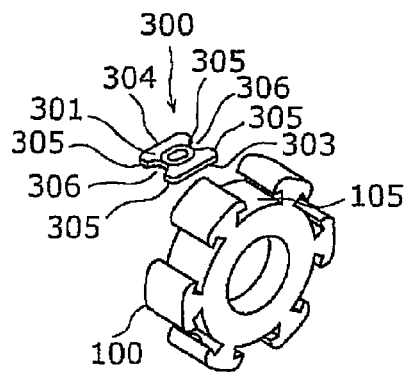
FIG. 4 includes diagrams illustrating steps for mounting the display board in the support body illustrated in FIG. 1.
Figure 4:
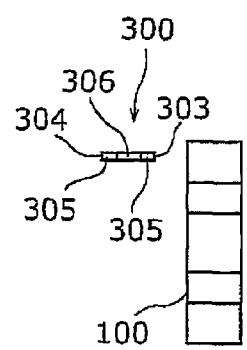
Figure 4:
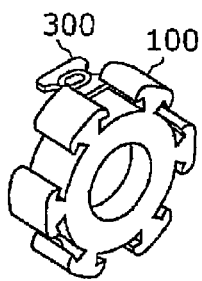
Figure 4:
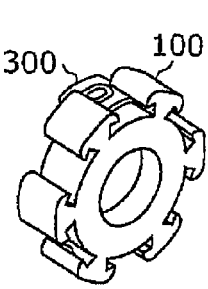
Figure 4:
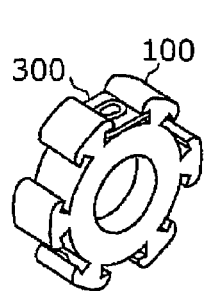
Figure 4:
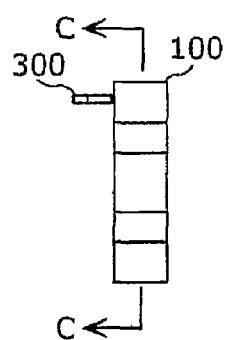
Figure 4:
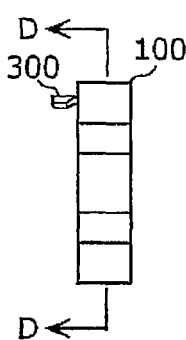
Figure 4:
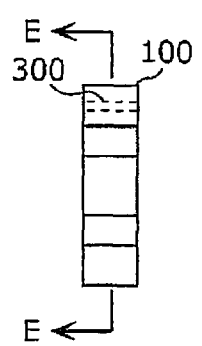
Figure 4:
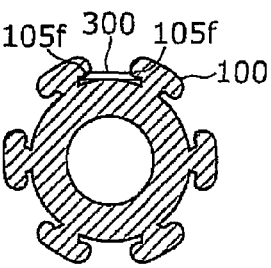
Figure 4:
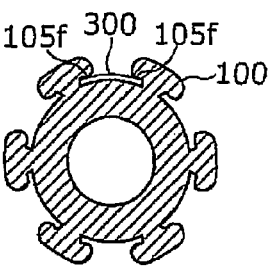
Figure 4:
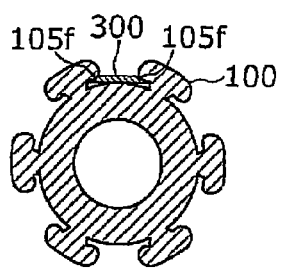

FIG. 4 includes diagrams in accordance with which mounting steps of each display board 300 with respect to the support body 100 will be described herein using the display board 300 displaying "0" on its top surface, by way of example.

Also, with reference to FIG. 4, shapes of the display board 300 changed by the deformation and shape restoration properties of the display board 300 in the steps of mounting the display board 300 in the support body 100 will hereafter be described.

FIG. 4(a1) is a perspective view illustrating a state before the display board 300 is inserted into the corresponding mounting portion 105 of the support body 100, as viewed from above and the front right.

FIG. 4(a2) is a diagram illustrating a state before the display board 300 is inserted into the mounting portion 105 of the support body 100, as viewed from the front.

FIGS. 4(a1) and 4(a2) are diagrams illustrating the same state as viewed from different directions.

The display board 300 illustrated in FIGS. 4(a1) and 4(a2) includes the display surface 301 displaying "0", a leading portion 303, a trailing portion 304, the side portions 305, and the cutaway portions 306. When the display board 300 is inserted into the mounting portion 105 of the support body 100, the leading portion 303 is located forward, the trailing portion 304 is located on a trailing side, and the side portions 305 are located at lateral sides. The cutaway portions 306 each form a second fitting portion with which the corresponding first fitting portion, which is formed by the projection 105f, becomes engaged when the display board 300 is mounted in the mounting portion 105.

FIG. 4(b1) illustrates a state in which the display board 300 is inserted into the mounting portion 105 by approximately a quarter of the distance between the leading portion 303 and the trailing portion 304. In this state, the leading portion 303 is not in contact with the projections 105f. Accordingly, the display board 300 does not need to deform.

FIG. 4(b2) shows a state in which the display board 300 is inserted into the mounting portion 105 by approximately a half of the distance between the leading portion 303 and the trailing portion 304.

When the display board 300 is pressed continuously from the state illustrated in FIG. 4(b1), the portions of the display board 300 extending from the leading portion 303 to the corresponding side portions 305 on both sides are brought into contact with the projections 105f. After this stage, a part of the display board 300 in the vicinity of the center of the area between the side portions 305 on both sides is stopped by the bulging portion 105g from being displaced toward the circular recessed portion 103. Simultaneously, portions of the display board 300 in the peripheries of the side portions 305 is displaced toward the circular recessed portion 103 using the spaces of the recessed portions 105h and avoid the projections 105f.

As a result, with reference to FIG. 4(b2), the display board 300 is deformed in such a manner that the display surface 301 forms a convex surface extending from one of the side portions 305 to the other one of the side portions 305.

FIG. 4(b3) shows a state in which the display board 300 is completely mounted in the mounting portion 105 after having been pressed continuously from the state illustrated in FIG. 4(b2).

With reference to FIG. 4(b3), after the cutaway portions 306 of the display board 300 reach such positions that the cutaway portions 306 are fitted to the projections 105f of the mounting portion 105, the side portions 305 move separately from the recessed portions 105h and the circular recessed portion 103 due to the shape restoration property of the display board 300. In this manner, the cutaway portions 306 are fitted to the projections 105f. In other words, the second fitting portions of the display boards 300 are fitted to the first fitting portions of the support body 100.

FIG. 4(c1) is a diagram showing the same state as the state illustrated in FIG. 4(b1), as viewed from the front.

FIG. 4(c2) is a diagram showing the same state as the state illustrated in FIG. 4(b2), as viewed from the front.

FIG. 4(c3) is a diagram showing the same state as the state illustrated in FIG. 4(b3), as viewed from the front.

FIG. 4(d1) is a diagram showing the C-C cross section in the state illustrated in FIG. 4(c1), as viewed from the right.

FIG. 4(d2) is a diagram showing the D-D cross section in the state illustrated in FIG. 4(c2), as viewed from the right.

FIG. 4(d3) is a diagram showing the E-E cross section in the state illustrated in FIG. 4(c3), as viewed from the right.

Next, a procedure for mounting the display board 300 in the mounting portion 105 of the support body 100 will be specifically described.

To begin the procedure, in a first step, the display board 300 is arranged on the side corresponding to the display window portion 105e with the display surface 301 facing in the opposite direction from the opposing wall 105b of the mounting portion 105. Then, the leading portion 303 of the display board 300 is arranged at the position corresponding to the insertion port 105d of the mounting portion 105.

Subsequently, in a second step, the display board 300 is moved forward until the portions of the display board 300 extending from the leading portion 303 to the corresponding side portions 305 contact the projections 105f.

In a third step, the display board 300 is continuously moved forward with such force that portions of the leading portion 303 in the proximities of the groove bottom walls 105c and the side portions 305 proceed beyond the slanted surfaces of the corresponding projections 105f.

Finally, in a fourth step, the display board 300 is inserted continuously until the cutaway portions 306 reach the positions corresponding to the projections 105f.

Mounting of the display board 300 in the mounting portion 105 is completed by the above-described procedure.

If the projections 105f do not have the slanted surfaces, a slanted surface may be formed in each of the portions of the display board 300 extending from the leading portion 303 to the corresponding side portions 305. This makes it possible to mount the display board 300 in the mounting portion 105 of the support body 100 by a procedure similar to the above-described procedure. In this case, the third step is modified to a step in which "the display board 300 is inserted continuously with such force that the slanted surfaces extending from the leading portion 303 to the corresponding side portions 305 proceed beyond the projections 105f".

After the display board 300 is inserted in the mounting portion 105 and held in the state illustrated in FIGS. 4(b3), 4(c3), and 4(d3), the display board 300 can be removed from the mounting portion 105 by the procedure described below.

In a first step, the display board 300 is pressed from one of the insertion ports 105d, each of which has an opening in the corresponding one of the left outer surface 101 and the right outer surface 102 of the support body 100, toward the other one of the insertion ports 105d in such a manner that the cutaway portions 306 proceed beyond the slanted surfaces of the projections 105f.

Next, in a second step, the display board 300 is pressed further outward or, alternatively, the portion of the display board 300 exposed from the insertion port 105d is pulled outward so that the display board 300 becomes completely separate from the mounting portion 105.

The display board 300 can be removed from the support body 100 by the above-described procedure.

Specifically, with reference to FIGS. 1(g) and 2, in each projection 105f of the support body 100, the portion from the base of the projection 105f on the side corresponding to the associated window side wall 105a to the top of the projection 105f is inclined at a moderate inclination angle. As a result, even when the projections 105f are fitted to the cutaway portions 306 as illustrated in FIG. 4(d3), the support body 100 and the display board 300 can be disengaged from each other by pressing the display board 300 from one of the insertion ports 105d toward the other one of the insertion ports 105d.

This is because the portions of the display board 300 extending from the peripheries of the cutaway portions 306 to the corresponding side portions 305 are guided along the inclination of the corresponding projections 105f and are displaced toward the recessed portions 105h and the circular recessed portion 103.

With reference to FIGS. 3(a) to 3(f), the display board 300 is shaped symmetrically in a lateral direction and a front-and-rear direction, except for the object displayed on the display surface 301. As a result, the display board 300 can be mounted even if the position of the trailing portion 304 and the position of the leading portion 303 are switched. In other words, the display board 300 can be inserted into the mounting portion 105 from each of the sides corresponding to the left outer surface illustrated in FIG. 3(b) and the side corresponding to the right outer surface illustrated in FIG. 3(d).

Further, the display board 300 is shaped symmetrically between the front surface and the back surface, as illustrated in FIGS. 3(a) to 3(f), except for the object displayed on the display surface 301. As a result, the display board 300 can be mounted even if the position of the display surface 301 and the position of the back surface 302 are switched. Specifically, by forming an indicator such as a number, a character, a code, an image, a color, or a pattern on the back surface 302, the back surface 302 can be employed as a display surface.

Figure 5A:
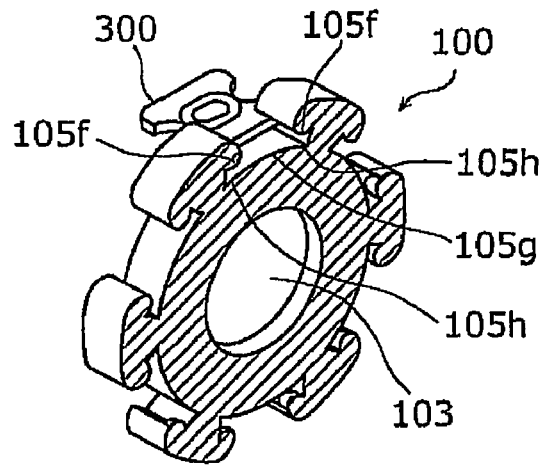
FIG. 5 includes cross-sectional views illustrating steps for mounting the display board in the support body illustrated in FIG. 1.
Figure 5B:
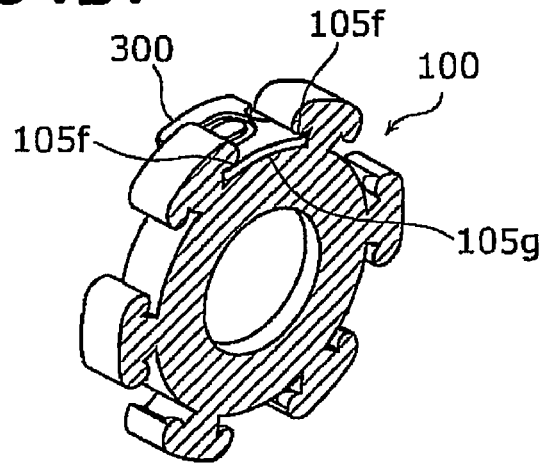
Figure 5C:
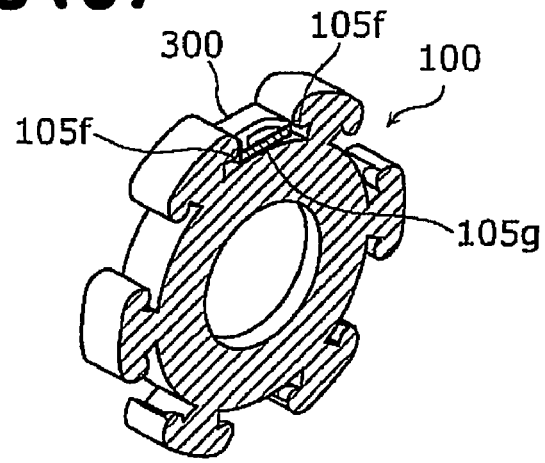
Figure 6A:
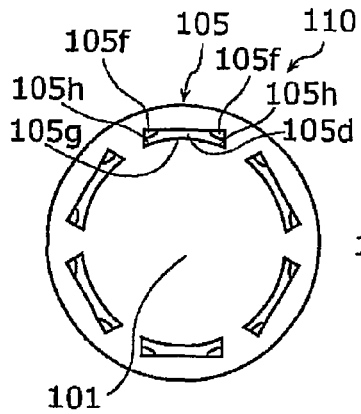
FIG. 6 included diagrams showing a support body having holes serving as display window portions as viewed from various directions, including cross-sectional views showing the support body.
Figure 6B:
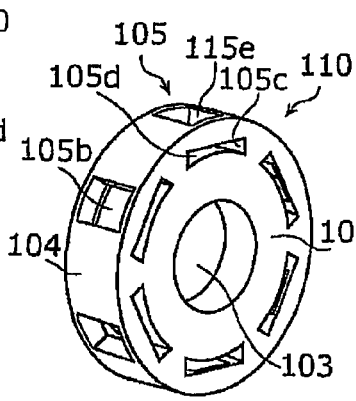
Figure 6C:
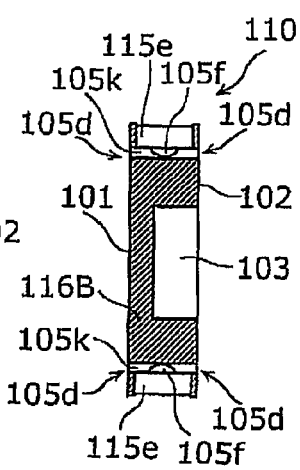
Figure 6D:
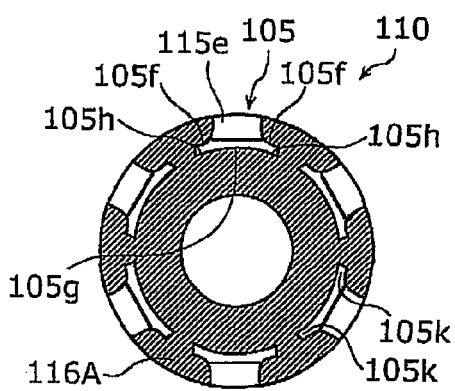
Figure 6E:
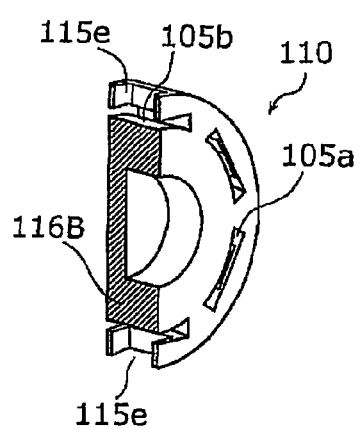
Figure 6F:
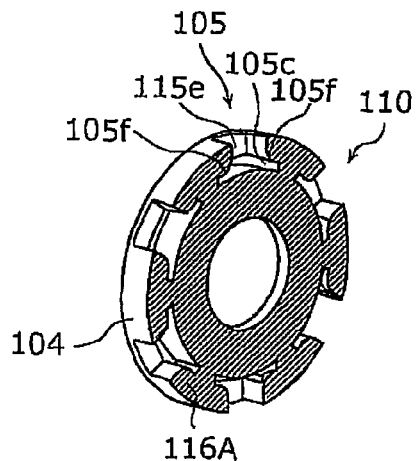
Figure 6G:
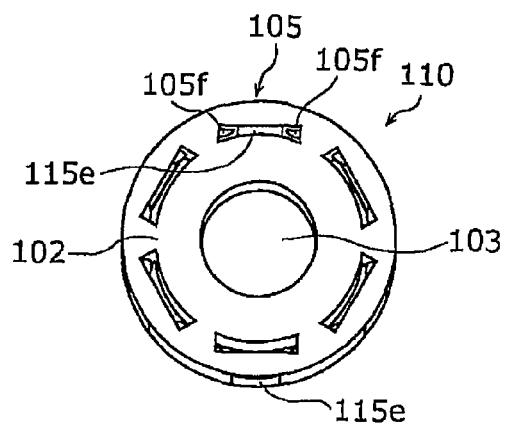

FIGS. 5(a) to 5(c) are perspective views showing the C-C cross section in the state illustrated in FIG. 4(c1), the D-D cross section in the state illustrated in FIG. 4(c2), and the E-E cross section in the state illustrated in FIG. 4(c3), respectively, as viewed from above and the front right.

For example, the support body 100 is prepared using polyoxymethylene. The left outer surface 101 and the right outer surface 102 are formed each with a maximum diameter of 24 mm and the thickness between the left outer surface 101 and the right outer surface 102 is set to 6 mm. Further, the display board 300 is prepared using hard vinyl chloride. The distance from the leading portion 303 to the trailing portion 304 is set to 6 mm and the interval between the side portions 305 on both sides is set to 7 mm. The thickness between the display surface 301 and the back surface 302 is set to 0.5 mm. In this case, attachment/detachment of the display board 300 with respect to the support body 100 illustrated in FIG. 4 can be carried out easily and repeatedly.

FIGS. 6(*a*) to 6(*g*) are diagrams showing a support body 110, which is a support body having display window portions 115*e* that are holes, as modified from the display window portions 105*e* that are the cutaway portions in the support body 100.

Each display window portion 105*e* is a cutaway portion extending from the main outer surface 104 to the window side walls 105*a* and from the left outer surface 101 to the right outer surface 102. In contrast, each display window portion 115*e* is a hole extending from the main outer surface 104 to the window side walls 105*a*.

FIGS. 6(*a*) to 6(*g*) are a left side view showing the support body 110, a perspective view showing the support body 110 as viewed from above and the front right, a diagram showing the B-B cross section as viewed from the front, a diagram showing the A-A cross section as viewed from the side corresponding to the right surface, a diagram showing the B-B cross section as viewed from above and the front right, a diagram showing the A-A cross section as viewed from above and the front right, and a diagram showing the support body 110 as viewed from slightly below and the right, respectively.

The position of the A-A cross section and the position of the B-B cross section correspond to the position illustrated in FIG. 2(*b*) and the position illustrated in FIG. 2(*c*), respectively.

The shaded area indicated by the reference numeral 116A in FIGS. 6(*d*) and 6(*f*) indicates the A-A cross section of the support body 110. The shaded area indicated by the reference numeral 116B in FIGS. 6(*c*) and 6(*e*) indicates the B-B cross section of the support body 110.

As in the case of the display window portions 105*e*, each of which is shaped bilaterally symmetric and forms the mirror-image shape along the A-A cross section, each of the display window portions 115*e* is shaped bilaterally symmetric and forms a mirror-image shape along the A-A cross section.

FIGS. 7(*a*) to 7(*f*) are diagrams showing a support body 120. Specifically, each display window portion 105*e* of the support body 100 that is a cutaway portion is modified to a display window portion 115*e* that is a hole in the support body 120. Also, each insertion port 105*d* of the support body 100 located on the side corresponding to the left surface of the support body 100, which allows both insertion and removal of a display board, is modified to a press-out hole 127 permitting only detachment of the display board in the support body 120.

FIGS. 7(*a*) to 7(*f*) are a left side view showing the support body 120, a front view showing the support body 120, a right side view showing the support body 120, a diagram showing the support body 120 as viewed from above and the front right, a diagram showing the B-B cross section as viewed from the front, and a diagram showing the B-B cross section as viewed from above and the front right, respectively. The position of the B-B cross section corresponds to the position illustrated in FIG. 2(*c*).

The shaded area indicated by the reference numeral 126B in FIGS. 7(*e*) and 7(*f*) indicates the B-B cross section of the support body 120.

FIGS. 7(*g*) and 7(*h*) are diagrams showing a support body 130 having press-out grooves 138 permitting only removal of a display board, which are modified from the press-out holes 127 on the side corresponding to the left surface of the support body 120.

The support body 120 and the support body 130 illustrated in FIG. 7 are shaped similarly to the support body 110. However, the support bodies 120, 130 are different from the support body 110 in that each of the support bodies 120, 130 does not have the insertion port 105*d* on the side corresponding to the left surface of the support body 120, 130 and that the support bodies 120, 130 each have the press-out holes 127 or the press-out grooves 138 on the side corresponding to the left surface.

In the support body 120 and the support body 130, the insertion ports are arranged only on one side of the corresponding insertion spaces. In these cases, even if a display board is pressed forward with excessive force, the display board is prevented from being inadvertently pressed out of an insertion port arranged at the opposite side.

To remove a display board from an insertion space of the support body 120, the display board is pressed out of the space from the press-out hole 127 toward the insertion port 105*d* using a bar-like object such as a pin.

To remove a display board from an insertion space of the support body 130, a bar-like or plate-like object may be employed.

Alternatively, in each of the support body 100 and the support body 110, a plurality of projections may be aligned from one insertion port toward the other insertion port.

Further, in each of the support body 120 and the support body 130, a plurality of projections may be arranged from the insertion port toward the wall including the press-out hole or the press-out groove.

This is because the multiple projections can be engaged altogether with a single cutaway portion or hole or recessed portion of the display board if the cutaway portion or the hole or the recessed portion is enlarged.

Alternatively, a plurality of cutaway portions or holes or recessed portions may be formed in the display board and a plurality of projections may each be fitted to the corresponding one of the cutaway portions, the holes, or the recessed portions.

FIGS. 8 and 9 are diagrams showing a support body 140, which is a different type from the support body 100, including views showing a display board 310 and a display board 320 that may be mounted in the support body 140.

FIGS. 8(*a*) to 8(*d*) are a top view, a left side view, a front view, and a right side view showing the support body 140, respectively. FIG. 8(*e*) is a diagram showing the F-F cross section as viewed from the side corresponding to the right surface of the support body 140. In the drawing, the shaded area indicated by the reference numeral 146F indicates the F-F cross section. FIG. 8(*f*) is a diagram showing the G-G cross section as viewed from the front. In the drawing, the shaded area indicated by the reference numeral 146G indicates the G-G cross section. The F-F cross section 146F is a cross section taken at the position corresponding to a half of the thickness of the support body 140.

FIG. 9(*a*) is a diagram showing the F-F cross section 146F as viewed from above and the front right. FIG. 9(*b*) is a diagram showing the G-G cross section 146G as viewed from above and the front right. FIG. 9(*c*) is a perspective view showing the support body 140 as viewed from above and the front right. FIG. 9(d) is a perspective view showing the support body 140 as viewed from above and the rear right.

As illustrated in FIGS. 8 and 9(a) to 9(d), the support body 140 has a left outer surface 141, a right outer surface 142, a circular recessed portion 143, a main outer surface 144, and mounting portions 145.

Like the mounting portions 105 of the support body 100, each of the mounting portions 145 of the support body 140 includes window side walls 145a, an opposing wall 145b, groove bottom walls 145c, insertion ports 145d, a display window portion 145e, a projection 145f, an insertion space, and slide grooves 145k. The reference numeral for the insertion space is omitted from the drawings.

Each opposing wall 145b faces the corresponding window side walls 145a. The clearance (the space) between the window side walls 145a and the opposing wall 145b is the insertion space. Side groove portions arranged on both sides of the insertion space are the slide grooves 145k. The slide grooves 145k are the grooves along which a display board is guided when the display board is inserted into the insertion space. Each of the insertion ports 145d has such a size to permit insertion of the display board into the insertion space.

Each of the mounting portions 145 is shaped bilaterally symmetrical, that is, has a mirror-image shape with respect to the F-F cross section 146F.

In the support body 140, a bulging portion and a projection of a first fitting portion are formed by the same part. As a result, each projection 145f not only becomes fitted to a second fitting portion formed in the display board, but also functions in the same manner as the bulging portion of the support body.

As illustrated in FIGS. 8 and 9(a) to 9(d), the width of each slide groove 145k of the support body 140 becomes wider toward the display window portion 145e. In other words, the opposing wall 145b is flat except for the projection 145f, which is projected. However, each window side wall 145a inclines toward the display window portion 145e in a manner separating from the opposing wall 145b along a direction toward the display window portion 145e.

In this manner, the projection 145f makes it easy for a central portion of a display board between side portions, which are arranged on both sides of the display board, to bend in a convex shape toward the display window portion 145e.

FIGS. 9(e) to 9(h) are diagrams showing the display board 310, which may be mounted in the support body 140. FIGS. 9(i) to 9(k) are diagrams showing a display board 320 shaped differently from the display board 310, which may be mounted in the support body 140.

FIGS. 9(e) to 9(h) are a top view, a bottom view, an L-L cross sectional view, and an M-M cross sectional view, showing the display board 310, respectively.

As illustrated in FIGS. 9(e) to 9(h), the display board 310 includes a display surface 311, a back surface 312, and a recessed portion 317. Like the display board 300 illustrated in FIGS. 4(a1) and 4(a2), a part of the display board 310 located forward when the display board 310 is inserted into a mounting portion of the support body corresponds to a leading portion 313. A part of the display board 310 located on a trailing side when the display board 310 is inserted corresponds to a trailing portion 314. Portions of the display board 310 located on both sides when the display board 310 is inserted correspond to side portions 315.

Figure 9A:
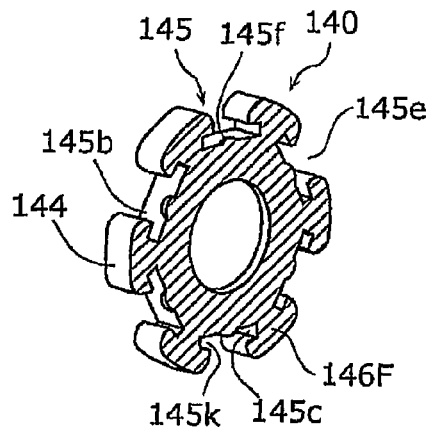
FIG. 9 includes perspective cross-sectional views and perspective views showing the support body illustrated in FIG. 8, and diagrams showing two types of display boards corresponding to the support body.
Figure 9B:
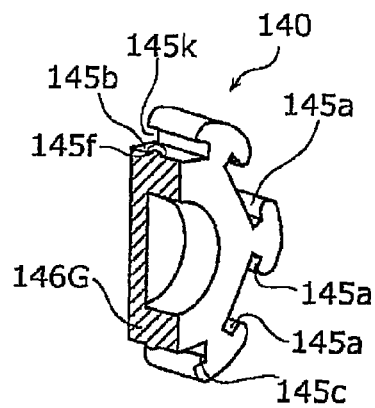
Figure 9C:
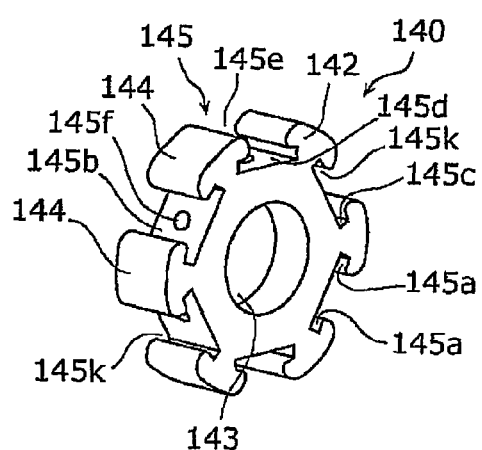
Figure 9D:
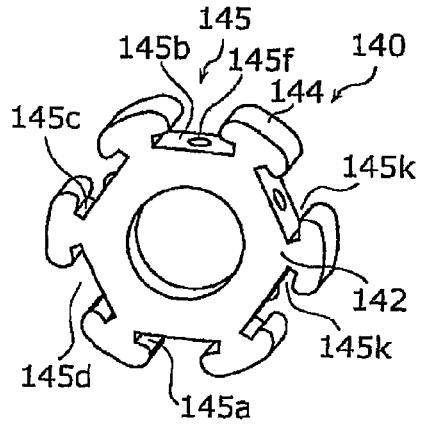
Figure 9E:
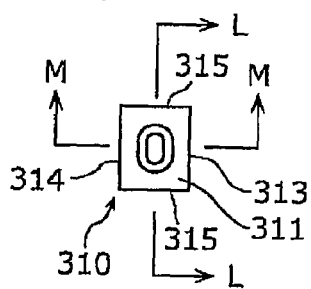
Figure 9G:
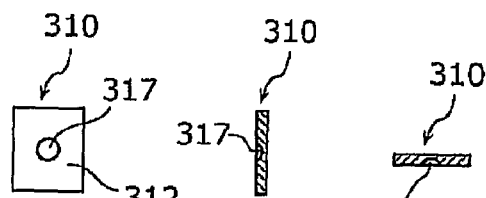
Figure 9I:
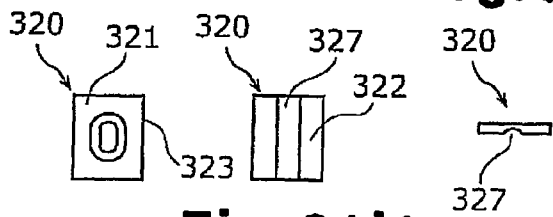

The right side of the display board 310 as viewed in FIG. 9(e) is the leading portion 313. However, since the display board 310 is shaped symmetrical in a lateral direction and a front-and-rear direction, the left side of the display board 310 as viewed in the drawing may be defined as the leading portion 313. The display surface 311 is illustrated as displaying "0" by way of example.

The display board 310 has the recessed portion 317 formed in the back surface 312. The recessed portion 317 forms a second fitting portion that is fitted to a first fitting portion formed by the projection 145f. The recessed portion 317 is a recessed (dent-like) portion.

The term "dent" refers to an opening with a solid bottom and the term "hole" refers to a through hole.

FIGS. 9(i) to 9(k) are a top view, a bottom view, and a front view, respectively, showing the display board 320.

With reference to FIGS. 9(i) to 9(k), the display board 320 has a display surface 321, a back surface 322, and a recessed portion 327. Like the display board 300 illustrated in FIGS. 4(a1) and 4(a2), a part of the display board 320 located forward when the display board 320 is inserted into a mounting portion of the support body corresponds to a leading portion 323. A part of the display board 320 located on a trailing side when the display board 320 is inserted corresponds to a trailing portion. Portions of the display board 320 located on both sides when the display board 320 is inserted correspond to side portions.

The right side of the display board 320 as viewed in FIG. 9(i) is the leading portion 323. However, the display board 320 is shaped symmetrical in a lateral direction and a front-and-rear direction. Accordingly, the left side of the display board 320 as viewed in the drawing may be defined as the leading portion. The display surface 321 is illustrated as displaying "0" by way of example.

The display board 320 has the recessed portion 327 formed in the back surface 322. The recessed portion 327 forms a second fitting portion that is fitted to the first fitting portion formed by the projection 145f. The recessed portion 327 is a groove-like recessed portion.

In the above-described support body 100, each projection 105f forming the first fitting portion is arranged on the bottom of the associated slide groove 105k on the side corresponding to the window side wall 105a. However, in the support body 140, each projection 145f is arranged in the vicinity of the center of the opposing wall 145b.

In other words, the projection of each first fitting portion may be arranged on either the window side wall or the opposing wall.

In the case of the support body 100, the portion of the display board extending from the portion of the leading portion in the vicinity of the groove bottom walls to the side portions deforms due to the deformation property of the display board. In this state, the display board proceeds beyond the projections each forming the first fitting portion and reaches the fitting position. At this stage, the second fitting portions of the display board and the first fitting portions of the support body become fitted to each other due to the shape restoration property of the display board.

Contrastingly, in the case of the support body 140, mainly the portion of the display board, such as the display board 310 or the display board 320, in the vicinity of the center of the leading portion deforms due to the deformation property of the display board. In this state, the display board moves beyond the projection 145f and the recessed portion of the display board reaches the fitting position. At this stage, the recessed portion of the second fitting portion and the projection 145f of the first fitting portion become fitted to each other due to the shape restoration property of the display board.

In accordance with FIG. 10, an example of a support body formed by two support body forming members will be described.

FIGS. 10(*a*1) to 10(*a*4) are diagrams showing a support body forming member 200A as viewed from various directions. FIGS. 10(*b*1) to 10(*b*4) are diagrams showing a support body forming member 200B as viewed from different directions. FIGS. 10(*c*1) to 10(*c*4) are diagrams showing a support body 200, which is formed by the support body forming member 200A and the support body forming member 200B, as viewed from various directions. FIGS. 10(*d*1) and 10(*d*2) are diagrams showing the H-H cross section of the support body 200 as viewed from different directions.

FIGS. 10(*a*1) to 10(*a*4) are a left side view, a front view, a right side view, and a perspective view from above and the front right, respectively, showing the support body forming member 200A. With reference to the drawings, the support body forming member 200A includes a left outer surface 201A, a circular recessed portion 203A, a main outer surface 204A, twelve projections 205*f*A, and a matching surface 209A. Reference numerals for insertion ports arranged on the side corresponding to the left outer surface 201A are omitted from the drawings.

FIGS. 10(*b*1) to 10(*b*4) are a left side view, a front view, a right side view, and a perspective view from above and the front right, respectively, showing the support body forming member 200B. With reference to the drawings, the support body forming member 200B includes a right outer surface 202B, a circular hole 203B, a main outer surface 204B, twelve projections 205*f*B, and a matching surface 209B. Reference numerals for insertion ports arranged on the side corresponding to the right outer surface 202B are omitted from the drawings.

FIGS. 10(*c*1) to 10(*c*4) are a left side view, a front view, a right side view, and a perspective view from above and the front right, respectively, showing the support body 200. As illustrated in the drawings, the support body 200 includes six mounting portions 105. Each of the mounting portions 105 includes a display window portion 105*e*, two projections 105*f*, and a bulging portion 105*g*. Reference numerals for a left outer surface, a right outer surface, a main outer surface, window side walls, an opposing wall, groove bottom walls, insertion ports, and slide grooves are omitted from the drawings.

The projections 105*f* of each mounting portion 105 are arranged at mutually opposing positions on the bottoms of the slide grooves, which are formed on both sides of the insertion space 105*j*, on the sides corresponding to the window side walls. Each of the projections 105*f* is located at the middle position between the insertion ports arranged on both ends of the corresponding one of the slide grooves.

FIG. 10(*d*1) is a front view showing the H-H cross section of the support body 200. FIG. 10(*d*2) is a diagram showing the H-H cross section as viewed from above and the front right. The shaded area indicated by the reference numeral 206A indicates the H-H cross section of the support body forming member 200A. The shaded area indicated by the reference numeral 206B indicates the H-H cross section of the support body forming member 200B.

The support body forming member 200A corresponds to a part of the support body 100 illustrated in FIGS. 1 and 2 on the side corresponding to the left outer surface 101 obtained by increasing the diameter of the circular recessed portion 103 and cutting and dividing the support body 100 at the A-A position illustrated in FIG. 2(*b*).

The support body forming member 200B is shaped identically with a part of the support body 100 on the side corresponding to the right outer surface 102 obtained by cutting and dividing the support body 100 at the A-A position. The matching surface 209B is shaped identically with the A-A cross section 106A.

With reference to FIGS. 10(*c*1) to 10(*c*4), 10(*d*1), and 10(*d*2), the support body 200 is formed by the support body forming member 200A and the support body forming member 200B by matching the matching surface 209A with the matching surface 209B and then arranging the projections 205*f*A in correspondence with the projections 205*f*B to form the projections 105*f*.

In other words, the matching surface 209A and the matching surface 209B are surfaces that are to be arranged to face each other and then matched together in order to form the support body 200.

By mounting the display boards 300 illustrated in FIG. 3 in the mounting portions 105 of the support body 200, the support body forming member 200A and the support body forming member 200B are connected together.

This is because each of the projections 105*f* is fitted to the corresponding one of the cutaway portions 306 of each display board 300, and each of the projections 205*f*A and the corresponding one of the projections 205*f*B are thus clamped together by the display board 300 from opposite sides.

By removing all the display boards 300 from the mounting portions 105 of all the support body 200, the support body 200 is divided into the support body forming member 200A and the support body forming member 200B.

This is because each display board 300 is removed from the corresponding mounting portion 105 while being deformed in the above-described manner, and, when the all display boards 300 are detached from the mounting portions 105, the projections 205*f*A and the projections 205*f*B are released from a state clamped from opposite sides.

As shown in FIGS. 10(*d*1) and 10(*d*2), the diameter of each circular recessed portion 203A is greater than the diameter of each circular hole 203B. As a result, by fitting an object such as a photograph or a decoration plate in the circular recessed portion 203A and joining the support body forming member 200A to the support body forming member 200B using the display boards 300, the object is held in place.

The components of the support body 200 illustrated in the drawings that are given the same reference numerals as the reference numerals of the corresponding components of the above-described support body 100 function in the same manner as the components of the support body 100. This applies to the other drawings.

FIG. 11 includes diagrams showing an example of a support body formed by three support body forming members.

FIGS. 11(*a*1) to 11(*a*4) are diagrams showing a support body forming member 200Ba as viewed from various directions. FIGS. 11(*b*1) to 11(*b*4) are diagrams showing a support body forming member 200Bb as viewed from various directions. FIGS. 11(*c*1) to 11(*c*4) are diagrams showing a support body 200 formed by the support body forming member 200A, the support body forming member 200Ba, and the support body forming member 200Bb as viewed from various directions.

With reference to FIG. 11, the support body forming member 200Ba and the support body forming member 200Bb each have a shape obtained by dividing the support body forming member 200B into two portions.

As has been described, a support body may be formed by three support body members or, alternatively, four or more support body forming members as long as each of the support body forming members includes insertion ports each formed at one of both ends of the corresponding slide groove and a part of each projection forming a first fitting portion at each surface to be matched with a corresponding surface. In this configuration, the support body forming members are joined together by mounting the display boards in the mounting portions of the support body formed by the support body forming members. The support body forming members may be disassembled from one another by removing the display boards from the mounting portions.

If one of the support body forming members that form the mounting portions has an insertion port and the other one of the support body forming members does not have an insertion port, only one joint of the support body forming members using the display boards is permitted. However, if the press-out holes or the press-out grooves illustrated in FIG. 7 are formed in the support body forming member without an insertion port, the support body forming members become detachable from each other.

FIG. 12 includes diagrams showing examples of other support body forming members that may be combined with the support body forming member 200A.

FIGS. 12(a1) to 12(a4) are diagrams showing a support body forming member 210B as viewed from various directions. FIGS. 12(b1) to 12(b4) are diagrams showing a support body 210 formed by the support body forming member 200A and the support body forming member 210B as viewed from various directions.

FIGS. 12(c1) to 12(c4) are diagrams showing a support body forming member 220B as viewed from various directions. FIGS. 12(d1) to 12(d4) are diagrams showing a support body 220 formed by the support body forming member 200A and the support body forming member 220B as viewed from various directions.

FIGS. 12(a1) to 12(a4) are a left side view, a front view, a right side view, and a perspective view from above and the front right, respectively, showing the support body forming member 210B.

As illustrated in the drawings, the support body forming member 210B includes a right outer surface 212B, a heart-shaped hole 213B, a hole 218B, and a matching surface 219B. In other words, in the support body forming member 210B, the heart-shaped hole 213B is modified from the circular hole 203B of the support body forming member 200B, and an annular portion having the hole 218B is added. Reference numerals for twelve projections are omitted from the drawings.

FIGS. 12(b1) to 12(b4) are a left side view, a front view, a right side view, and a perspective view from above and the front right, respectively, showing a support body 210. The support body 210 is formed by the support body forming member 200A and the support body forming member 210B by matching the matching surface 209A with the matching surface 219B and arranging a part of each projection forming a first fitting portion with a corresponding portion of the projection forming the first fitting portion.

FIGS. 12(c1) to 12(c4) are a left side view, a front view, a right side view, and a perspective view from above and the front right, respectively, showing a support body forming member 220B.

With reference to the drawings, the support body forming member 220B includes a right outer surface 222B, a star-shaped hole 223B, a hole 228B, and a matching surface 229B. In other words, in the support body forming member 220B, the star-shaped hole 223B is modified from the heart-shaped hole 213B of the support body forming member 210B. Reference numerals for twelve projections are omitted from the drawings.

FIGS. 12(d1) to 12(d4) are a left side view, a front view, a right side view, and a perspective view from above and the front right, respectively, showing a support body 220, which is formed by the support body forming member 200A and the support body forming member 220B in the same manner as the support body 210.

The circular hole 203B, the heart-shaped hole 213B, and the star-shaped hole 223B each form a window through which an object received in the circular recessed portion 203A is visible from the exterior. The shapes of the holes 203B, 213B, and 223B may be modified to other shapes. Further, a transparent glass or plastic member may be fitted in the holes.

The circular recessed portion 203A may have a shape other than the circular shape. Alternatively, a heart-shaped or star-shaped hole may be formed in the circular recessed portion 203A. In this case, the object held in the circular recessed portion 203A is visible from the side corresponding to the left outer surface 201A of the support body forming member 200A.

The hole 218B and the hole 228B are holes for facilitating joint between the display structure and other members. If a chain or a cord is passed directly or indirectly through the hole 218B, 228B, the display structure may be used as a pendant.

Alternatively, the display structure of the present invention may be connected to a pierced earring through a joint hole such as the hole 218B or the hole 228B. In this case, the display structure is used as an earring.

In the display structure of the present invention, the position or the extending direction of the joint hole, such as the hole 218B or the hole 228B, may be modified in such a manner that the display structure can be connected to a safety pin and used as a broach, a badge, or a name tag.

As has been described, by adding a structure, such as a hole, for facilitating joint to other members to the display structure of the present invention, the display structure may be used for various purposes.

Alternatively, with a surface of a photograph or a picture facing a transparent support body forming member, the photograph or the picture may be clamped between the support body forming member and another support body forming member. In this state, by joining the support body forming members through the display boards, the display structure may be used as a photograph stand or a frame. In this case, the circular hole or the heart-shaped hole may be omitted.

Alternatively, in this case, the dimensions and the positions of the second fitting portions and the first fitting portions may be adjusted in such a manner that the photograph or the picture may be clamped directly between the matching surfaces so that the circular recessed portion can be omitted. Further, if the display structure having such configuration has legs that are attached to the main outer surface or the proximity of the main outer surface of the display structure, the display structure may be held upright in a stable state with the main outer surface facing downward. Alternatively, the legs may be attached to the display structure in such a manner that the display structure can be held upright with the main outer surface facing upward or laterally.

The outline of the display structure may be changed from a thin columnar shape to a thin rectangular prism-like shape.

As to the configuration non-related to attachment/detachment of the display boards, corresponding portions of the support body forming members forming the support body of the present invention may be hinged together. In this case, when the display boards are all removed from the mounting portions, the support body forming members are prevented from separating from each other and being lost. Also, simply by matching the support body forming members about the rotary shaft of a hinge, the corresponding projections of the support body forming members are matched together accurately. This facilitates mounting of the display boards.

FIG. 13 includes diagrams showing a support body having a spherical shape, not a flat plate-like shape.

FIGS. 13(a) to 13(f) are a top view, a left side view, a front view, a right side view, a bottom view, and a perspective view from above and the front right, respectively, showing a support body 230.

FIGS. 13(g) and 13(h) are a diagram from the side corresponding to the right surface and a diagram from above and the front right, respectively, showing the cross section of the support body 230 cut at the J-J position in FIG. 13(c). The shaded area indicated by the reference numeral 236 indicates the J-J cross section.

As illustrated in FIG. 13, the support body 230 includes a left outer surface 231, a right outer surface 232, a main outer surface 234, and mounting portions 105.

Like the mounting portions 105 of the support body 100, each of the mounting portions 105 of the support body 230 includes insertion ports 105d, a display window portion 105e, and projections 105f. Reference numerals for window side walls, an opposing wall, groove bottom walls, and slide grooves are omitted from the drawings.

As illustrated in the drawings, the main outer surface may be connected to the left outer surface or the right outer surface through a curved surface, not in a mutually perpendicular manner.

The main outer surface and the left outer surface or the right outer surface may be arranged diagonally with respect to each other. In other words, the support body may have any suitable shape as long as the shape allows formation of the mounting portions. The functions of each display board with respect to the mounting portion are independent from the outline shape of the support body.

With reference to FIG. 13, the support body of the present invention does not necessarily have to include the circular recessed portion. The circular recessed portion may be formed depending on the purpose of the display structure.

In FIG. 2, each slide groove 105k extends linearly and perpendicularly to the left outer surface and the right outer surface. However, each slide groove of the support body 230 illustrated in FIG. 13 does not extend perpendicularly to the left outer surface or the right outer surface. That is, there are cases in which the slide groove does not extend perpendicularly to the left outer surface or the right outer surface depending on the outline shape of the support body. Further, the slide groove does not necessarily have to be perpendicular to the left outer surface or the right outer surface.

FIG. 14 shows an example of a cross-shaped support body.

FIGS. 14(a) to 14(f) are a top view, a left side view, a front view, a right side view, a bottom view, and a perspective view from above and the front right, respectively, showing a support body 240.

FIGS. 14(g) and 14(h) are a diagram from the side corresponding to the right surface and a diagram from above and the front right, respectively, showing the cross section of the support body 240 cut at the K-K position in FIG. 14(c). The shaded area indicated by the reference numeral 246 indicates the K-K cross section.

As illustrated in FIG. 14, the support body 240 has mounting portions 105. Each of the mounting portions 105 of the support body 240 has insertion ports 105d, a display window portion 105e, and projections 105f. Reference numerals for a left outer surface, a right outer surface, a main outer surface, window side walls, an opposing wall, groove bottom walls, a bulging portion, and slide grooves are omitted from the drawings.

As illustrated in the drawings, the support body may be cross-shaped.

The support body 230 or the support body 240 may each be formed by two support body forming members as in the case of the support body 200.

For example, the support body 230 and the support body 240 may be cut along the J-J cross section 236 and the K-K cross section 246, respectively, and each divided into two support body forming members. In these cases, the support body forming members may be joined together by mounting the display boards in the mounting portions 105, as in the case of the support body forming member 200A and the support body forming member 200B.

If a recessed portion is formed in the J-J cross section 236 or the K-K cross section 246, along which the support body is cut, as in the case of the support body forming member 200A, the recessed portion may be used as an accommodation space for an object.

The support body 230 or the support body 240 may each be formed by three or more support body forming members. The support body may be disassembled into the support body forming members by removing each display board from the corresponding mounting portion of the support body, which is formed by the multiple support body forming members.

As has been described with reference to FIGS. 10 to 14, using the structural characteristics of each support body forming member forming the support body of the present invention, each display board is allowed to function as an attachable/detachable joint tool without losing its function as a display board.

As illustrated in FIGS. 13 and 14, each mounting portion of the present invention may be formed in various bodies which are different in shape. Further, with reference to FIGS. 10 to 12, the support body may be divided into the support body forming members that may be joined together through the display boards, in such a manner that each mounting portion is divided into two portions. Also, by arranging an accommodation space between the support body forming members, a display structure capable of accommodating an object is provided.

Figure 15:
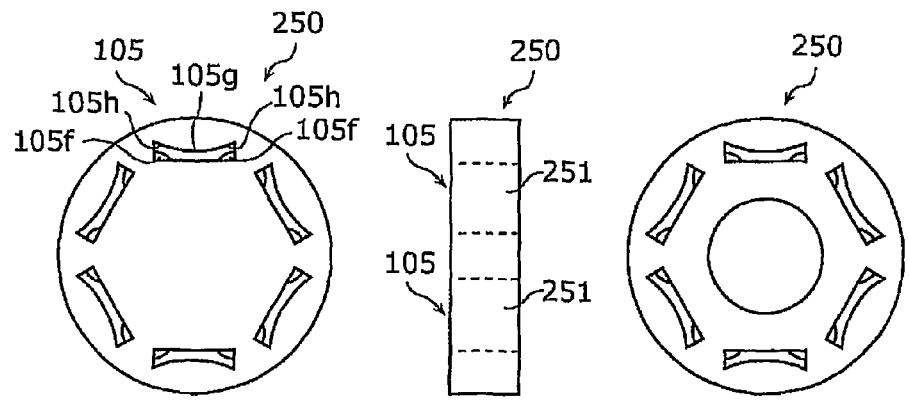
FIG. 15 includes diagrams showing a support body having a transparent display window portion and bulging portions formed on window side walls, a support body having projections, and a display board corresponding to the support body.
Figure 15:
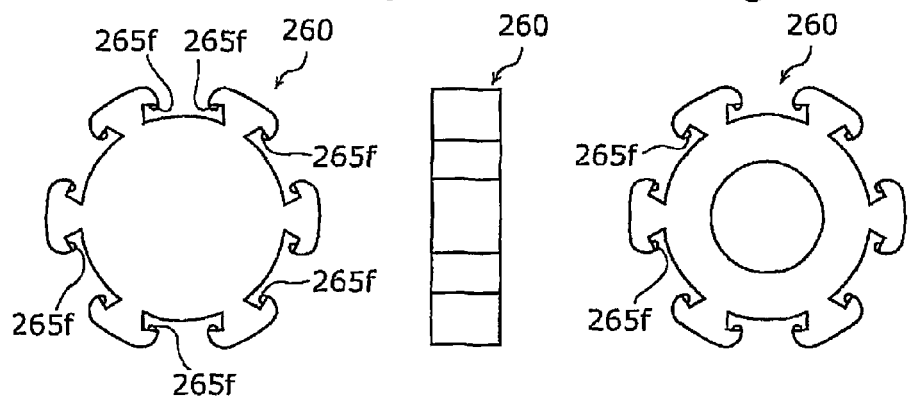
Figure 15:
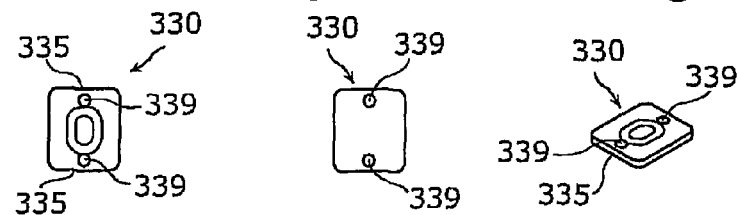

FIG. 15 includes diagrams showing a support body 250, a support body 260, and a display board 330, which are shaped differently from the above-described examples.

FIGS. 15(a1) to 15(a3) are diagrams showing the support body 250 as viewed from various directions. FIGS. 15(b1) to 15(b3) are diagrams showing the support body 260 as viewed from various directions. FIGS. 15(c1) to 15(c3) are diagrams showing the display board 330 as viewed from various directions.

FIGS. 15(a1) to 15(a3) are a left side view, a front view, and a right side view, respectively, showing the support body 250. Reference numerals for a left outer surface, a right outer surface, window side walls, an opposing wall, groove bottom walls, a main outer surface, insertion ports, and slide grooves are omitted from the drawings.

With reference to the drawings, the support body 250 has bulging portions 105g on the sides corresponding to the window side walls. Projections 105f are arranged on the bottoms of the slide grooves on the sides corresponding to the opposing walls. Since display window portions 251 are transparent, the main outer surface of the support body 250 includes neither cutaway portions nor holes.

In other words, forming the display window portions 251 using transparent material makes it unnecessary to form cutaway portions or holes in the main outer surface as window portions. This makes it possible to form the bulging portions on the sides corresponding to the window side walls.

As has been described, the display window portions of the support body of the present invention may be formed of transparent material, not by cutaway portions or holes. Also, each bulging portion may be arranged on the side corresponding to the window side walls. The material and the position of each display window portion and those of each bulging portion may be selected in correspondence with use of the display structure or the cost for manufacturing the display structure.

The projections forming the first fitting portions may be arranged on either the window side walls or the opposing walls. If each bulging portion, along which the corresponding display board moves in a bending manner when the display board is inserted into the insertion space, is located on a wall opposing the wall having the projections forming the first fitting portions, the projections must be arranged on or in the vicinities of the bottoms of the corresponding slide grooves. As a result, regardless of whether the projections are arranged on the side corresponding to the window side walls or the sides corresponding to the opposing wall, the portion of each display board between the side portions on both sides is effectively bent in a convex shape or a concave shape with respect to the side portions.

If the projections forming the first fitting portions are also the bulging portions along which the display boards move in a bending manner when inserted and thus the bulging portions are not formed in the walls opposing the walls having the projections, each of the projections must be located in or in the vicinity of a middle position between the slide grooves on both sides. As a result, regardless of whether each projection is arranged on the side corresponding to the window side wall or the side corresponding to the opposing wall, the portion of each display board between the side portions on both sides is effectively bent in a convex shape or a concave shape with respect to the side portions.

FIGS. 15(*b*1) to 15(*b*3) are a left side view, a front view, and a right side view, respectively, showing a support body 260. Unlike the support body 100, the support body 260 has projections 265*f*, each of which is arranged at a position slightly closer to a display window portion than the bottom of a slide groove. The support body 260 is shaped identically with the support body 100 except for the positions of the projections 265*f*.

Reference numerals for a left outer surface, a right outer surface, a main outer surface, mounting portions, window side walls, opposing walls, groove bottom walls, insertion ports, display window portions, bulging portions, and slide grooves are omitted from the drawings.

FIGS. 15(*c*1) to 15(*c*3) are a top view, a bottom view, and a perspective view from above and the front right, respectively, showing a display board 330 mounted in the support body 260.

As illustrated in the drawings, the display board 330 has fitting holes 339, which are arranged in the vicinities of side portions 335 and fitted to the projections 265*f* of the support body 260. If the height of each of the projections 265*f* is adjusted, the fitting holes 339 can be formed as dents.

Although the top surface of the display board 330 illustrated in FIG. 15(*c*1) displays "0", by way of example, any suitable object may be displayed on the top surface of the display board 330 as needed when in use.

The examples of the display boards that may be used in the present invention have been described with reference to the drawings. However, in the display boards other than the display board 310 and the display board 320 usable for the support body 140, the back surface and the display surface of each display board may be switched so that the back side is used as the display surface. As long as the holes or the dents forming the second fitting portions are located at positions other than the center of the back surface and the vicinity of the center as in the case of, for example, the display board 300 and the display board 330, the back surface may be used as the display surface without deteriorating the aesthetic appearance. Even if the back surface of the display board 300 or the display board 330 is used as the display surface, each second fitting portion of the display board 300, 330 functions as the second fitting portion.

Each display board may be curved uniformly as a whole, as long as the projections forming the first fitting portions are arranged at mutually opposing positions on or in the vicinities of the bottoms of the slide grooves on both sides and the corresponding bulging portion formed on the wall opposing the walls having the projections is a moderately curved surface and has a uniform radius of curvature.

A specific example will hereafter be described using the support body 100 and the display boards 300. As illustrated in FIGS. 1 and 2, the bulging portion 105*g* formed on each opposing wall 105*b* has a uniform radius of curvature and is a moderately curved surface. As each display board 300 is inserted into the corresponding insertion space 105*j*, the two projections 105*f* arranged at the mutually opposing positions on the bottoms of the slide grooves 105*k* on both sides on the sides corresponding to the window side walls 105*a* depresses the side portions 305 on both sides of the display board 300 toward the side corresponding to the opposing wall 105*b*. As a result, the display board 300 is bent uniformly along the bulging portion 105*g* with the portion of the display board 300 in the vicinity of the center of the back surface 302 supported by the bulging portion 105*g*.

Specifically, such uniform bending of the display board has an advantage in that a plastic or metal material difficult to bend may be used as the material of the display board and that excessive bending and whitening of a deformed portion are prevented from happening. As a result, the display board may be formed of various types of plastics and metals.

If the bulging portion on the opposing wall or the window side wall is formed as a moderately curved surface, the display board contacts the bulging portion over a large surface area without being intensely locally scratched when inserted into the insertion space. This prevents intense friction damage to the proximities of the centers of the display surface and the back surface of the display board. As a result, a number or a character or a code may be displayed on the back surface and the back surface and the display surface may be switched for use.

The support body 240 has four mounting portions 105 and the other support bodies each have six mounting portions 105. However, the number of the mounting portions arranged in each support body is not restricted to any number and may be one, two, five, or eight. That is, the mounting portions may be arranged in the support body by a number suitable for use.

The number of the projections each forming the first fitting portion may be varied from one mounting portion to another in one support body. The number of the projections of each mounting portion is not restricted to any number as long as the display board and the support body are engageable with each other, in other words, as long as the first fitting portions are formed.

In the case of the support body 120, the press-out holes do not necessarily have to be formed if it is unnecessary to remove the display boards after the display boards are mounted.

Each mounting portion of the support body 100, the support body 110, and the support body 140 is shaped symmetrical with respect to the A-A cross section 106A, the A-A cross section 116A, and the F-F cross section 146F, respectively. However, the mounting portions do not necessarily have to be shaped symmetrical.

If the mounting portions of each support body are not shaped symmetrically with respect to the corresponding cross sections, the distance between the side portions on both sides of each display board and the distance between the leading portion and the trailing portion of the display board may be determined in correspondence with the width of each insertion port or the depth of the mounting portion. Also, each second fitting portion of the display board may be formed at a position corresponding to the position and the shape of the corresponding first fitting portion of the mounting portion. Further, the thickness between the display surface and the back surface may be determined in correspondence with the shape of the mounting portion. In other words, the display boards do not necessarily have to be shaped symmetrically either.

Each mounting portion of the support body 100, the support body 110, the support body 140, and the support body 200 has the insertion ports on both of the side corresponding to the left outer surface and the side corresponding to the right outer surface. However, the support body may have insertion ports only on one of the side corresponding to the left outer surface and the side corresponding to the right outer surface. Also, the insertion ports may be formed on different sides from one mounting portion to another in one support body. In other words, one of the mounting portions may have an insertion only on the side corresponding to the left outer surface when another one of the mounting portions has an insertion port only on the side corresponding to the right outer surface and another one of the mounting portions has insertion ports on both of the side corresponding to the left outer surface and the side corresponding to the right outer surface.

As has been described, in the display structure formed by the display boards and the support body of the present invention, even if the display board has insufficient deformation property and insufficient shape restoration property, and being small in size, it is possible to attach and detach the display board with respect to the support body. As a result, the display structure as a whole or the display board solely may be reduced in size.

Also, the support body may be divided into a plurality of support body forming members, and each display board may be used as an attachable/detachable joint member. Further, by forming an accommodation space between the support body forming members that are joined together, an object may be selectively accommodated in and removed from the accommodation space.

As has been described, there are various uses for the display structure of the present invention. Alternatively, the two support body forming members forming the support body may be joined together through a hinge. With reference to FIGS. 16 and 17, various applications of the display structure of the present invention will hereafter be described.

Figure 16A:
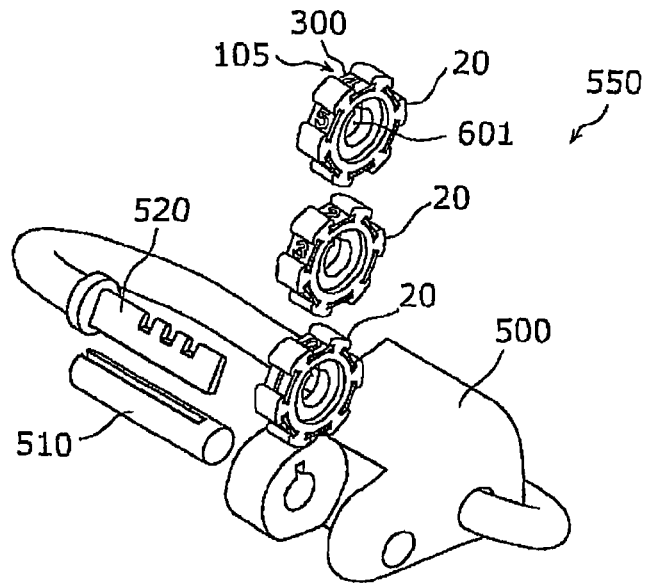
FIG. 16 includes diagrams showing a dial lock including display structures according to the present invention as dial members and the display structures.

FIG. 16(a) is an exploded perspective view showing a dial lock 550 configured by a lock body 500, three display structures 20 each functioning as a dial member, a shaft 510 serving as a rotary shaft for the display structures 20, and a locking member 520 having a plurality of projections locked to the display structures 20.

Figure 16B:
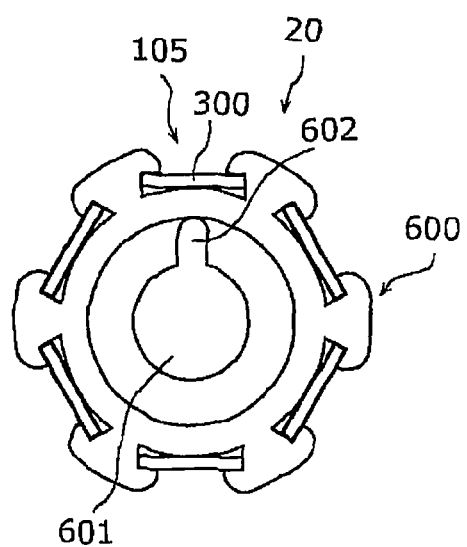
Figure 16C:
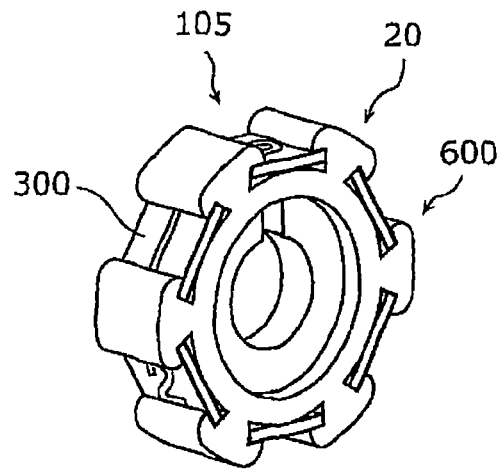
Figure 18A:
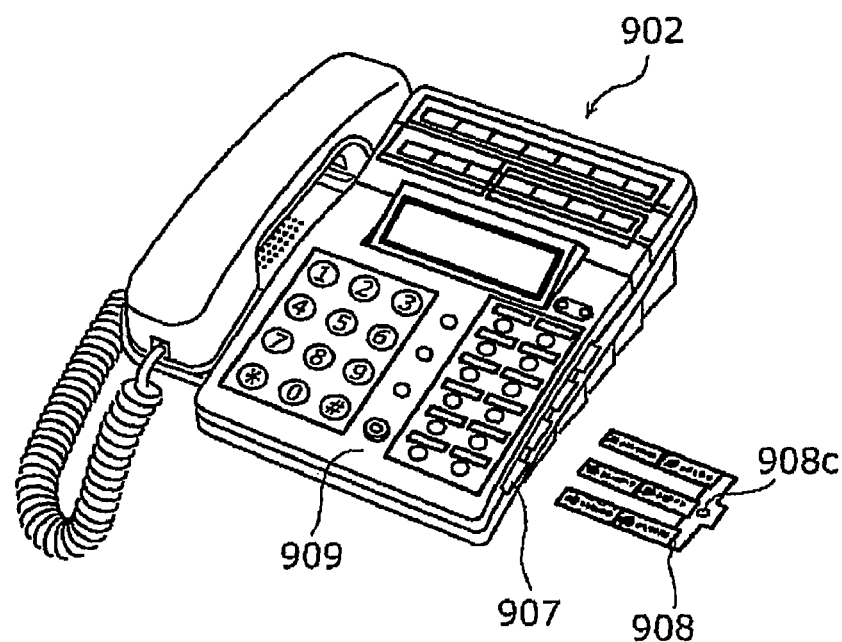
FIG. 18 includes diagrams schematically showing the configuration of a telephone set as an example of a conventional display structure.
Figure 18B:
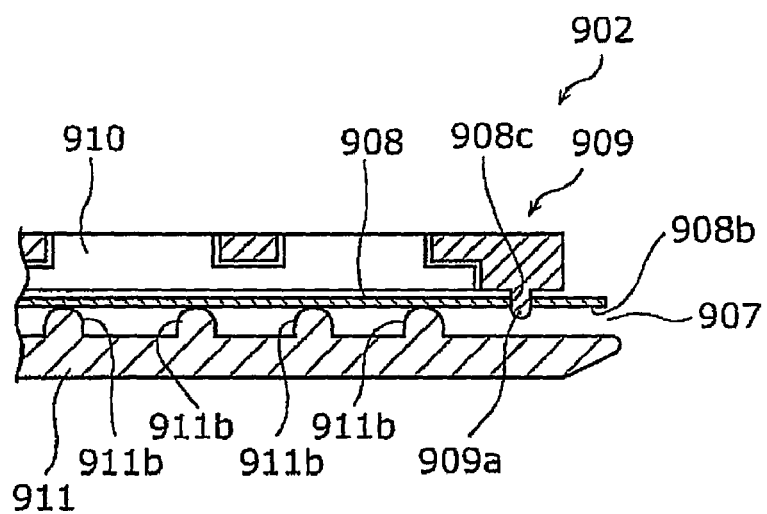

FIG. 16(b) is a right side view showing each of the display structures 20 and FIG. 16(c) is a perspective view showing the display structure 20 as viewed from above and the front right, as enlarged compared to FIG. 16(a). Each display structure 20 is shaped bilaterally symmetrical except for an object displayed on a display board 300.

As illustrated in FIGS. 16(b) and 16(c), the display structure 20 is formed by mounting each of the display boards 300 in a corresponding one of six mounting portions formed in a support body 600.

In order to function as the dial member of the dial lock 550, each display structure 20 includes a hole 601 through which the shaft 510 is passed and a cutaway portion 602 through which the projections of the locking member 520 are moved when the dial lock 550 is unlocked.

The structural characteristics and relationships with attachment/detachment of the support body 600 and the display boards 300 are the same as the characteristics and relationships of configuration related to attachment/detachment of the support body 100 and the display boards 300.

As has been described, the display structure of the present invention may be used as a dial member of a dial lock.

FIG. 17 includes diagrams illustrating various applications of the display structure of the present invention.

Specifically, FIGS. 17(a) to 17(i) each show an example of the display structure of the present invention.

FIGS. 17(a) to 17(i) are perspective views showing an animal collar 30, a head band 35, a bracelet 40, a photo stand 45, and a bolt 50 with a nut 55, a garment belt 60, a watch band 65, a ballpoint pen 70, and a bag 75, respectively.

These display structures may be configured by mounting the display boards 300 displaying a name or a date in a support body, which forms a base.

Alternatively, the display structures may be configured by mounting the display boards 300 displaying various colors or patterns in a support body forming a base.

The support body forming the base of the photo stand 45 is formed by two support body forming members. Accordingly, the display boards 300 can be mounted after a photo is arranged between the support body forming members.

Alternatively, the display structure of the present invention may be embodied as, for example, a frame using the same configuration as that of the photo stand 45.

Each of the display structures illustrated in FIGS. 17(a) to 17(i) includes a plurality of mounting portions 105, each of which receives a display board 300. However, the mounting portions 145 may be employed instead of the mounting portions 105 and the display boards 310 may be used. In other words, various display structures may be formed using the mounting portions and the display boards having the characteristics of the present invention.

FIG. 17(j) is a perspective view showing a support body 280 in which the support body forming member 200A and the support body forming member 200B are connected to each other through a single hinge 281.

The support body forming members may be hinged together in this manner.

The various applications of the display structure of the present invention have been described so far with reference to FIGS. 16 and 17. However, the display structure of the invention is not restricted to the above-described examples and may be used for other purposes. Further, additional components such as a hinge may be added to the display structure of the invention as long as the attachment/detachment structure of the display board, which is the technical characteristic of the display structure, is ensured.

INDUSTRIAL APPLICABILITY

By modifying the circular recessed portion to be a through hole extending from the left outer surface to the right outer surface and adjusting the size of the display structure of the invention as a whole, the display structure may be used as a ring, a bracelet, or a dial member of a dial lock. Alternatively, by shaping the outline of the support body in a C-shape, the display structure may be used as a head accessory including a head band or a hair pin.

Also, by adding an additional component such as a chain, a cord, a buckle, or a safety pin to the display structure, the display structure may be used as a necklace, a broach, a pendant, a badge, a charm card, a name tag, an ID tag, a collar for animals including dogs and cats, a shipping tag, or a baggage tag.

As has been described, the display structure of the present invention can be assembled and disassembled by a user. As a result, the display structure provides a wide variety of inexpensive display structures.

DESCRIPTION OF THE REFERENCE NUMERALS 10, 20 Display Structure
30 Collar
35 Head Band
40 Bracelet
45 Photo Stand
50 Bolt
55 Nut
60 Belt
65 Watch Band
70 Ballpoint Pen
75 Bag
100, 110, 120, 130, 140, 200, 210, 220, 230, 240, 250, 260, 280, 600 Support body
101, 141, 201A, 231 Left Outer Surface
102, 142, 202B, 212B, 222B, 232 Right Outer Surface
103, 143, 203A Circular Recessed Portion
104, 144, 204A, 204B, 234 Main Outer Surface
105, 145 Mounting Portion
105a, 145a Window Side Wall
105b, 145b Opposing wall
105c, 145c Groove Bottom Wall
105d, 145d Insertion Port
105e, 115e, 145e, 251 Display Window Portion
105f, 145f, 205fA, 205fB, 265f Projection
105g Bulging Portion
105h Recessed Portion
105j Insertion Space
105k, 145k Slide Groove
106A A-A Cross Section
106B B-B Cross Section
116A A-A Cross Section of Support body 110
116B B-B Cross Section of Support body 110
126B B-B Cross Section of Support body 120
127 Press-Out Hole
138 Press-Out Groove
146F F-F Cross Section
146G G-G Cross Section
200A, 200B, 200Ba, 200Bb, 210B, 220B Support Body Forming Member
203B Circular Hole
206A H-H Cross Section of Support body Forming Member 200A
206B H-H Cross Section of Support body Forming Member 200B
209A, 209B, 219B, 229B Matching Surface
213B Heart-Shaped Hole
218B, 228B Hole
223B Star-Shaped Hole
236 J-J Cross Section
246 K-K Cross Section
281 Hinge
300, 310, 320, 330 Display Board
301, 311, 321 Display Surface
302, 312, 322 Back Surface
303, 313, 323 Leading Portion
304, 314 Trailing Portion
305, 315, 335 Side Portion
306 Cutaway Portion
317, 327 Recessed Portion
339 Fitting Hole
500 Lock Body
510 Shaft
520 Locking Member
550 Dial Lock
601 Hole
602 Cutaway Portion
902 Telephone Set
907 Sheet Insertion Port
908 Sheet
908b Holding Portion
908c Small Hole
909 Body
909a Stopper Projection
910 Transparent Member
911 Sheet Guide
911b Projection

What is claimed is:

1. A display structure comprising a display board and a support body for supporting the display board, wherein:
the support body has a mounting portion in which the display board is mounted,
the mounting portion has a display window portion, an insertion port, an insertion space, and slide grooves;
the display window portion is a window through which the display board is displayed, the display window portion being a cutaway portion or a hole extending from an outer surface of the support body to the insertion space or formed of a transparent material in such a manner that the display board received in the insertion space is visible from a side corresponding to the outer surface of the support body;
the insertion port is an inlet port through which the display board is inserted into the insertion space, the insertion port having an opening in the outer surface of the support body at a position different from the position of the display window portion;
the insertion space is arranged at a position continuous from the insertion port, the insertion space being a space in which the display board is accommodated in a sliding manner, the insertion space being a space between a window side wall formed on a side corresponding to the display window portion and an opposing wall opposing the window side wall;
the slide grooves are side grooves arranged on both sides of the space between the window side wall and the opposing wall, the slide grooves being located on both sides of the insertion space, the slide grooves being grooves along which the display board is guided when inserted into the insertion space;
the window side wall or the opposing wall has a first fitting portion having a projection formed at a position over which at least a part of the display board passes when the display board is inserted into the insertion space;

the display board includes a display surface, a back surface, a leading portion, a trailing portion, two side portions, and a second fitting portion and has a deformation property and a shape restoration property;

the display surface and the back surface are arranged to be front and back, the leading portion is a portion located forward when the display board is inserted into the insertion space in the sliding manner;

the trailing portion is a portion located on a trailing side when the display board is inserted into the insertion space in the sliding manner;

the two side portions are side portions arranged on both sides of the display board and in a space between the display surface and the back surface, and a space between the leading portion and the trailing portion, each of the side portions being a portion located in the corresponding one of the slide grooves on both sides when the display board is inserted into the insertion space in the sliding manner;

the second fitting portion has a cutaway portion, a hole, or a recess that is fitted to the first fitting portion;

one of the window side wall and the opposing wall has a bulging portion bulging in or in the vicinity of a middle position between the slide grooves formed on both sides;

the slide grooves on both sides, the first fitting portion, and the bulging portion are arranged in such a manner that, when the display board is inserted into the insertion space through the insertion port until the display board reaches an fitting position at which the second fitting portion and the first fitting portion become fitted to each other, a portion between the two side portions of the display board deforms in a convex or concave shape toward the display surface with respect to the side portion so as to avoid the projection of the first fitting portion due to the deformation property of the display board;

the second fitting portion and the first fitting portion become fitted to each other at the fitting position due to the shape restoration property of the display board; and the display board has at least one of a number, a character, a code, an image, a color, and a pattern forming an indicator formed on at least the display surface.

2. The display structure according to claim 1, wherein:
the insertion space extends through the support body; and
the mounting portion has the insertion port at each of both ends of the insertion space.

3. The display structure according to claim 2, wherein, when the window side wall has the bulging portion, the projection of the first fitting portion is one of projections formed at mutually opposing positions on or in the vicinities of the bottoms of the slide grooves located on both sides of the insertion space and on a side corresponding to the opposing wall, and wherein, when the opposing wall has the bulging portion, the projection of the first fitting portion is one of projections formed at mutually opposing positions on or in the vicinities of the bottoms of the slide grooves located on both sides of the insertion space and on a side corresponding to the window side wall.

4. The display structure according to claim 3, wherein:
the projection of the first fitting portion is arranged in or in the vicinity of a middle position between the insertion ports arranged at both ends of the insertion space;
the support body is formed by a plurality of support body forming members;

two of the support body forming members each have a matching surface, the matching surfaces of the support body forming members being matched together;

one of the two support body forming members has one of the insertion ports formed at both ends of the insertion space and a part of the projection of the first fitting portion;

the other one of the two support body forming members has the other one of the insertion ports formed at both ends of the insertion space and the remaining part of the projection of the first fitting portion;

the mounting portion is formed by matching the two support body forming members with each other at the matching surfaces;

the cutaway portion, the hole, or the recess of the second fitting portion of the display board is one of cutaway portions, holes, or recesses arranged in or in the vicinity of a middle position between the leading portion and the trailing portion and in or in the vicinities of the side portions on both sides; and the two support body forming members are joined together through the display board when the display board is inserted into and mounted in the mounting portion formed by the support body forming members and the projection of the first fitting portion becomes fitted to the cutaway portion, the hole, or the recess of the second fitting portion.

5. The display structure according to claim 2, wherein the projection of the first fitting portion is the same part as the bulging portion.

6. The display structure according to claim 5, wherein:
the projection of the first fitting portion is arranged in or in the vicinity of the middle position between the insertion ports located at both ends of the insertion space;
the support body is formed by a plurality of support body forming members;
wherein two of the support body forming members each have a matching surface, the matching surfaces of the support body forming members being matched with each other;
one of the two support body forming members has one of the insertion ports arranged at both ends of the insertion space and a part of the projection of the first fitting portion;
the other one of the two support body forming members has the other one of the insertion ports arranged at both ends of the insertion space and the remaining part of the projection of the first fitting portion;
the mounting portion is formed by matching the two support body forming members with each other at the matching surfaces;
the hole or the recess of the second fitting portion of the display board is located at a position in or in the vicinity of the middle position between the leading portion and the trailing portion and in or in the vicinity of a middle position between the side portions on both sides; and
the two support body forming members are joined together through the display board when the display board is inserted into and mounted in the mounting portion formed by the support body forming members and the projection of the first fitting portion becomes fitted to the hole or the recess of the second fitting portion.

7. The display structure according to claim 4, wherein at least one of the matching surfaces of the two support body forming members has a recessed portion.

8. The display structure according to claim 7, wherein the support body forming member having the recessed portion further includes a through hole, the through hole being arranged at a position through which the recessed portion is connected to an outer surface.

9. The display structure according to claim 7, further comprising a hinge for joining the two support body forming members together.

10. The display structure according to claim 4, wherein the matching surface of each of the two support body forming members has a through hole extending to an outer surface.

11. The display structure according to claim 1, wherein:
the mounting portion has the insertion port formed on a side corresponding to the trailing portion of the display board, and a press-out hole or a press-out groove on a side corresponding to the leading portion of the display board when the display board is mounted in the mounting portion; and
the press-out hole is a hole through which the display board mounted in the mounting portion is pressed out of the insertion port, the press-out groove being a groove through which the display board mounted in the mounting portion is pressed out of the insertion port.

12. The display structure according to claim 1, wherein the display-structure is one of a dial ring of a dial lock, an accessory, an animal collar, a photo stand, a frame, a garment belt, a watch band, a writing material, a name tag, a bag, a nut, and a bolt.

13. The support body according to claim 1, wherein the support body supports the display board.

14. The support body forming member according to claim 4, wherein the support body forming member is said one of the two support body forming members.

15. The support body forming member according to claim 6, wherein the support body forming member is said one of the two support body forming members.

* * * * *